United States Patent [19]

Kaetzel

[11] 4,203,277
[45] May 20, 1980

[54] FORKLESS HAYMAKING MACHINE

[75] Inventor: Pierre Kaetzel, Saverne, France

[73] Assignee: Samibem, S.A., Marmoutier, France

[21] Appl. No.: 950,300

[22] Filed: Oct. 10, 1978

[30] Foreign Application Priority Data

| Oct. 7, 1977 [FR] | France | 77 30787 |
| Jun. 23, 1978 [FR] | France | 78 20085 |
| Jul. 27, 1978 [FR] | France | 78 22906 |

[51] Int. Cl.² ............................................ A01D 81/00
[52] U.S. Cl. ..................................... 56/377; 56/370; 56/376
[58] Field of Search ................. 56/365, 366, 370, 376, 56/377

[56] References Cited

U.S. PATENT DOCUMENTS

| 2,511,100 | 6/1950 | Clark | 56/376 |
| 3,074,222 | 1/1963 | Cunningham | 56/376 |
| 3,377,788 | 4/1968 | Pickrell | 56/377 |
| 3,962,854 | 6/1976 | van der Lely | 56/370 |
| 3,971,203 | 7/1976 | van der Lely | 56/370 |

FOREIGN PATENT DOCUMENTS 1,444,282  7/1976  United Kingdom .................... 56/370

Primary Examiner—Russell R. Kinsey
Attorney, Agent, or Firm—Young & Thompson

[57] ABSTRACT

A haymaking machine comprising drums rotating about substantially vertical axes and driving thin flexible skirt-like elements of rubber or the like with or without stiffeners or control devices. The skirt-like elements may be attached to the drums or to an endless belt which laps the drums, and these elements may be of various shapes and be with or without edge spikes or other projections. In operation these elements follow the ground contours and lift and entrain the cut fodder.

97 Claims, 39 Drawing Figures

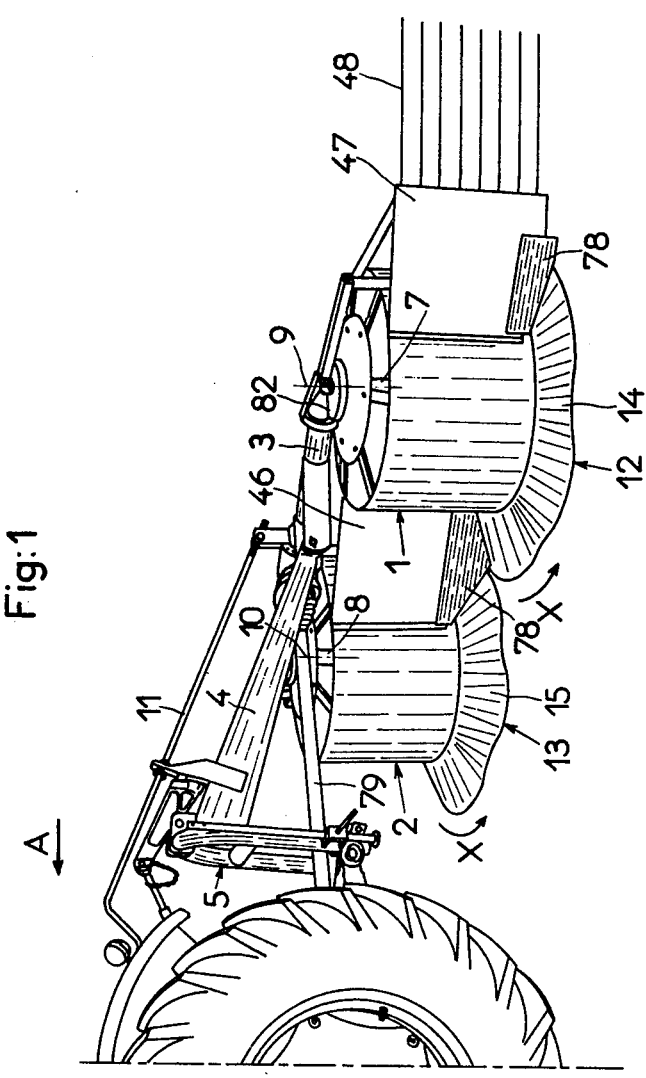

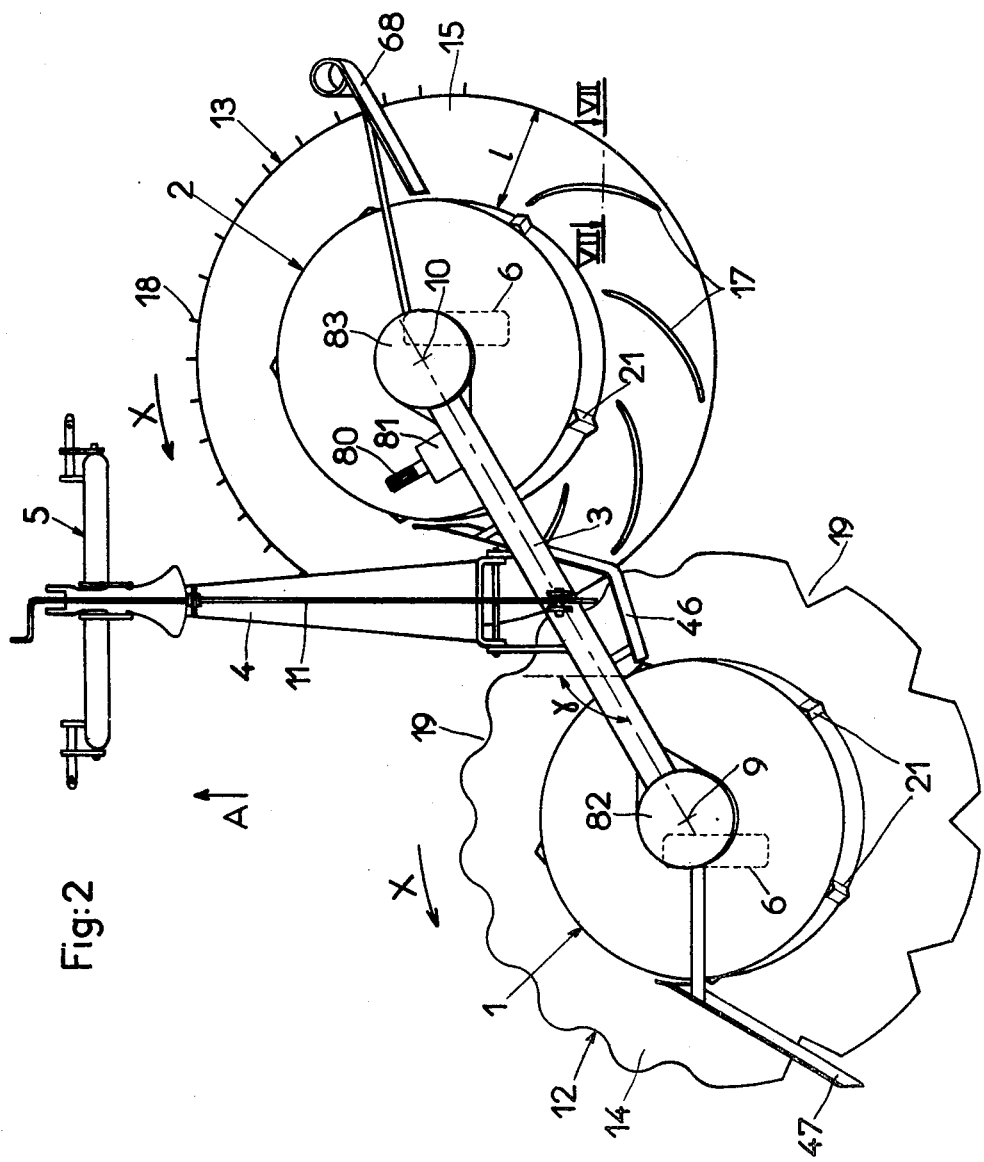
Fig: 2

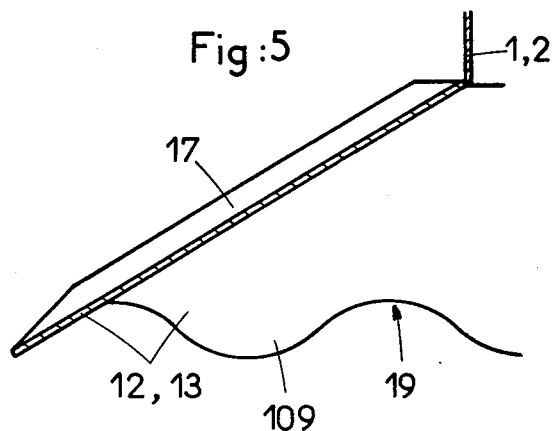
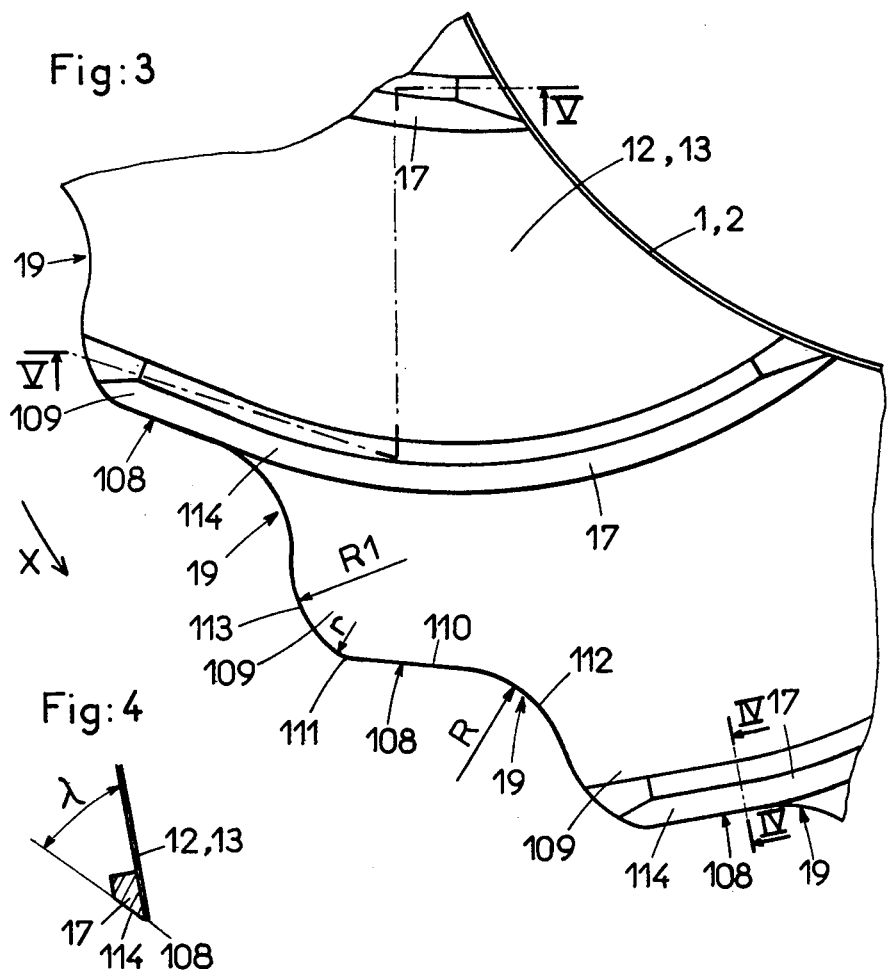

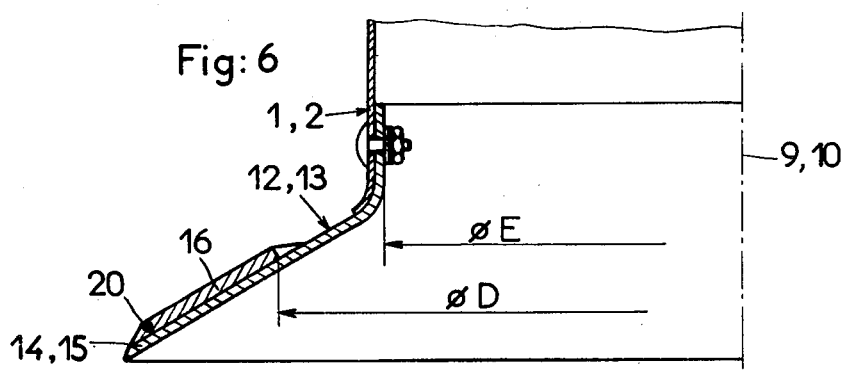
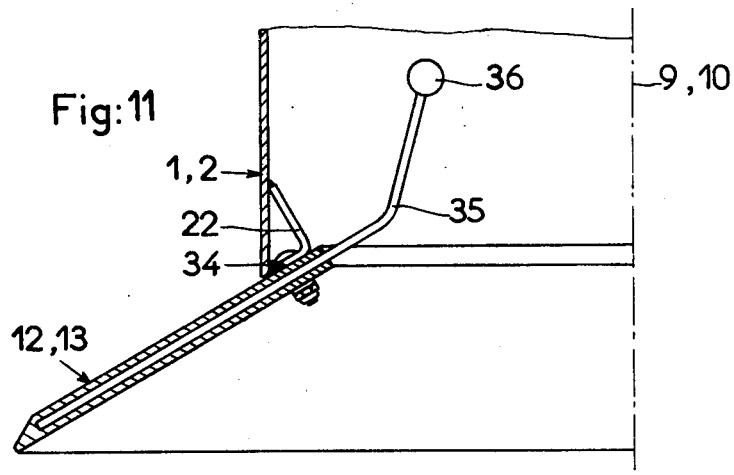
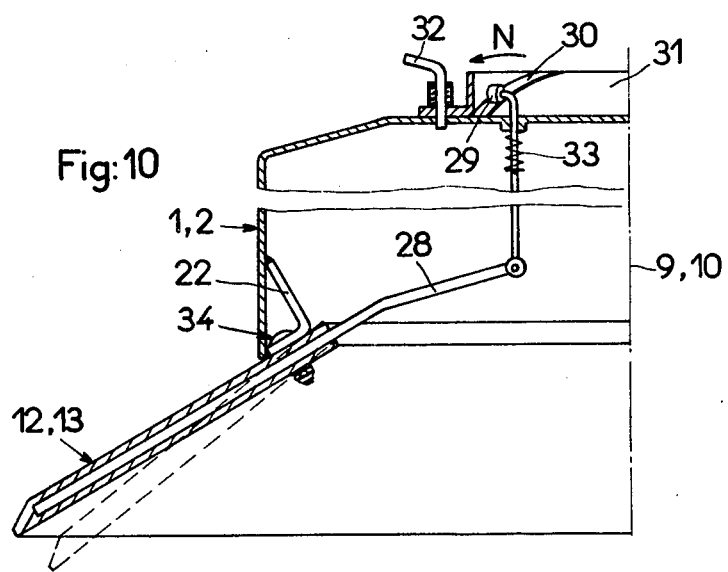

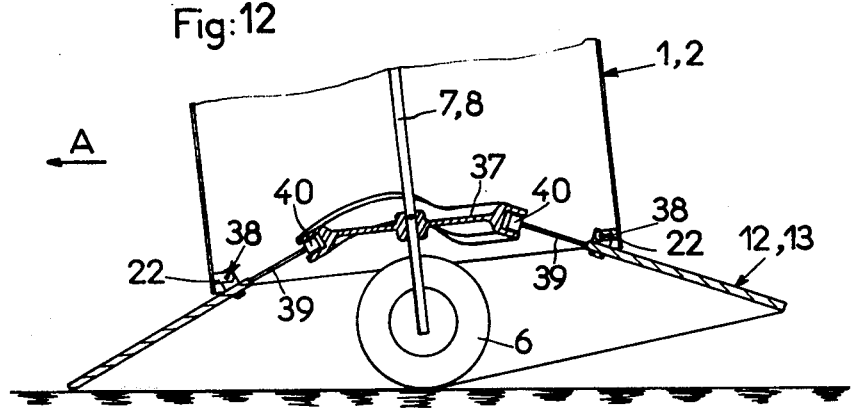
Fig: 12
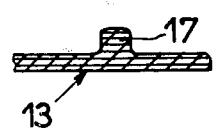
Fig: 7
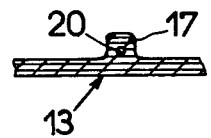
Fig: 8

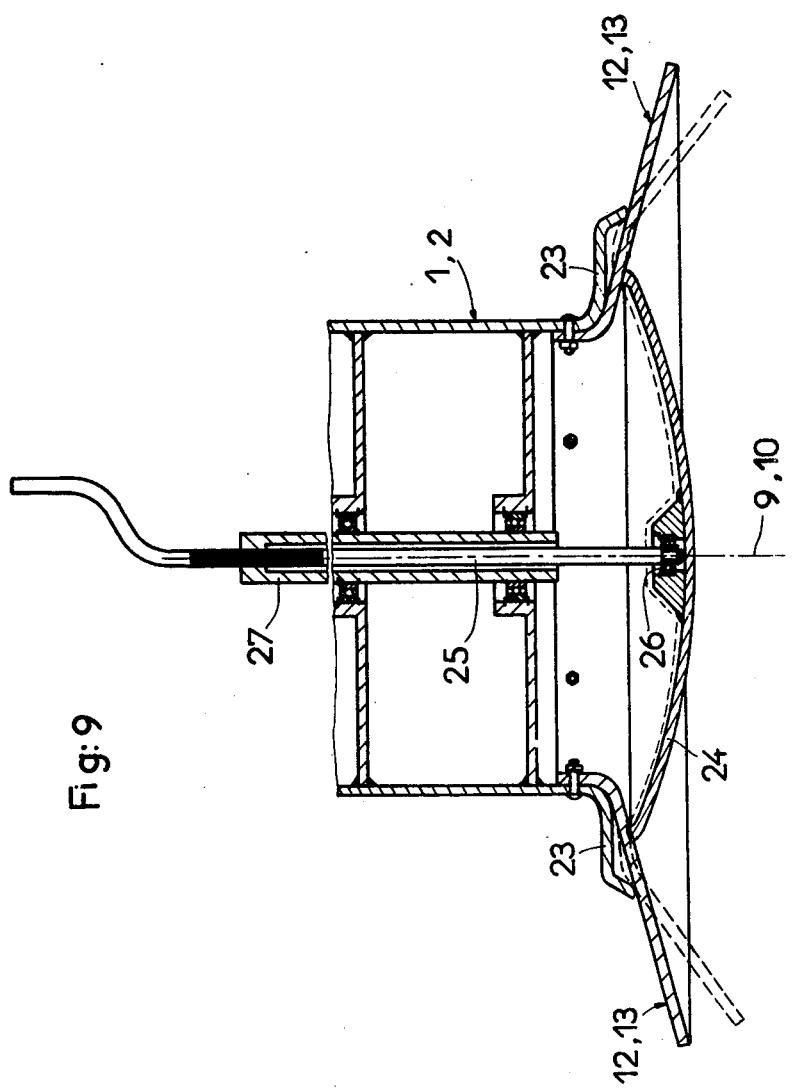

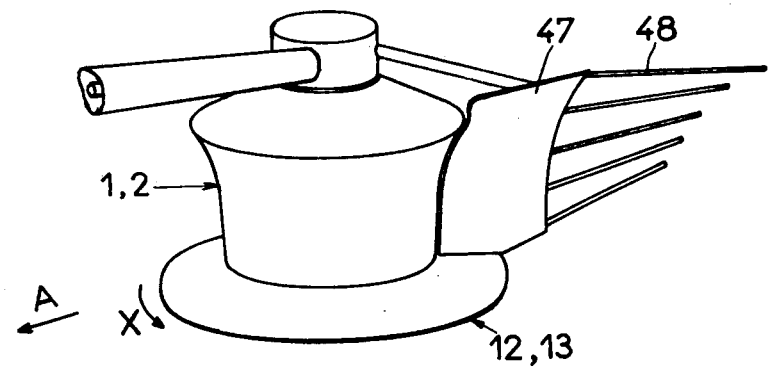
Fig: 13
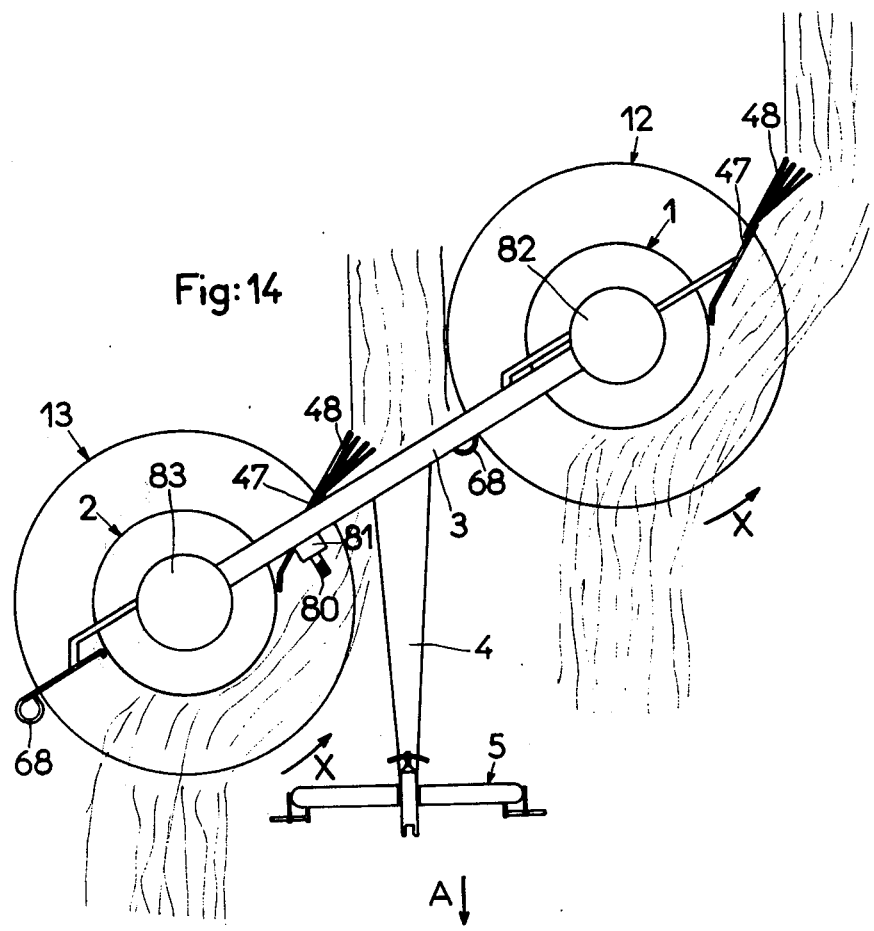
Fig: 14

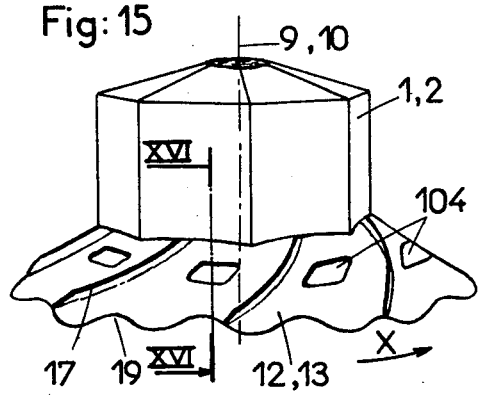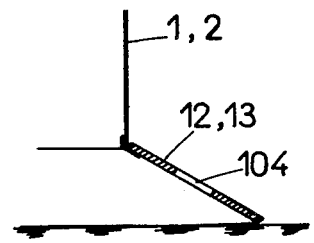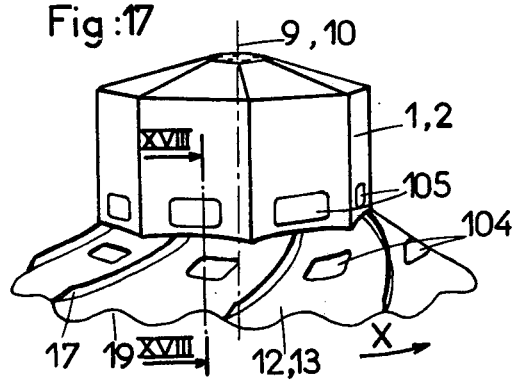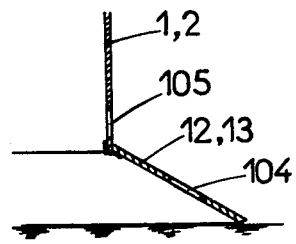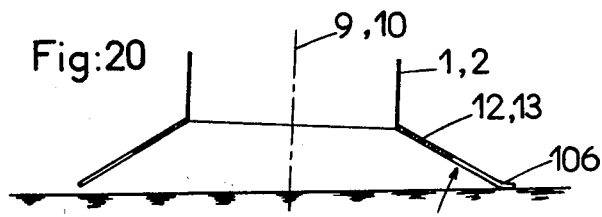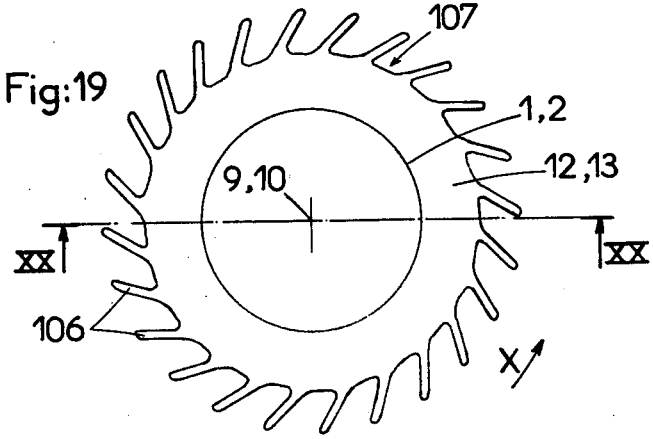

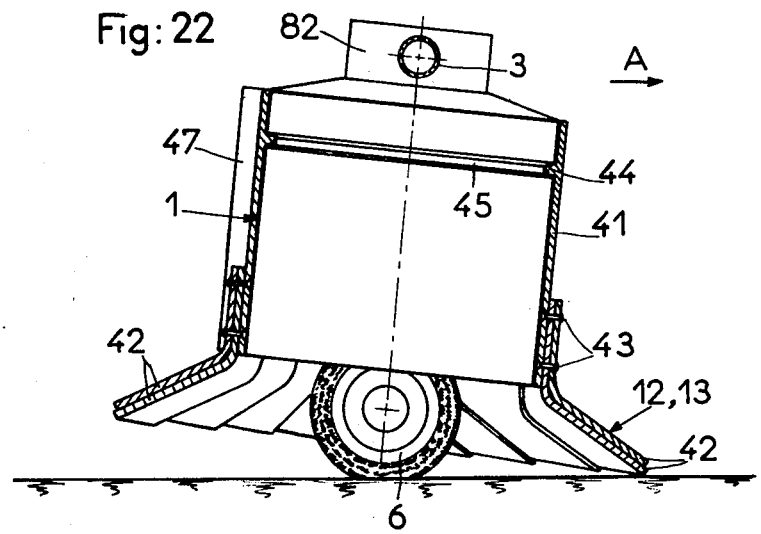
Fig: 22
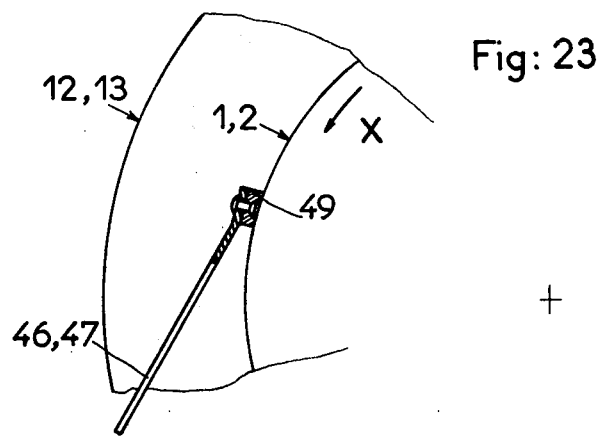
Fig: 23
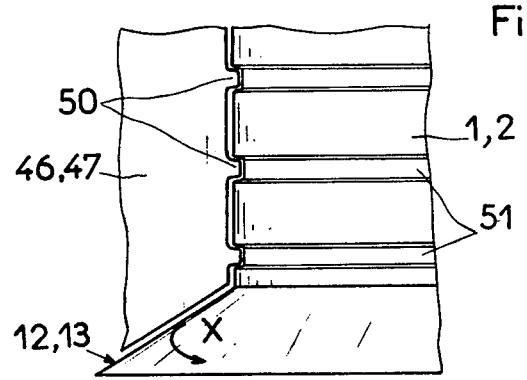
Fig: 24

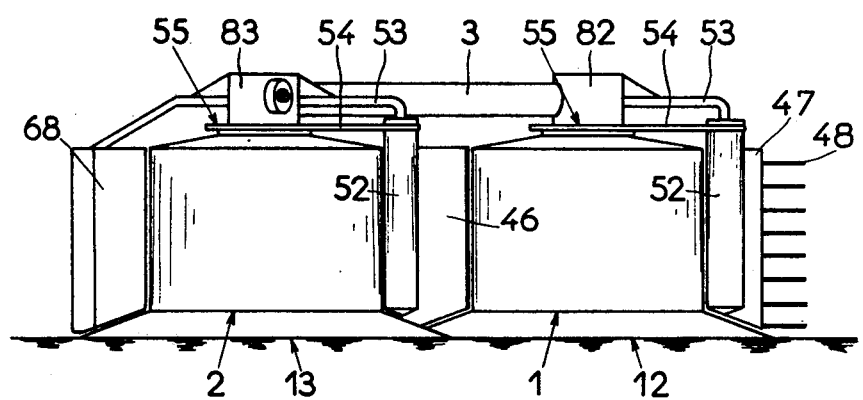
Fig: 25
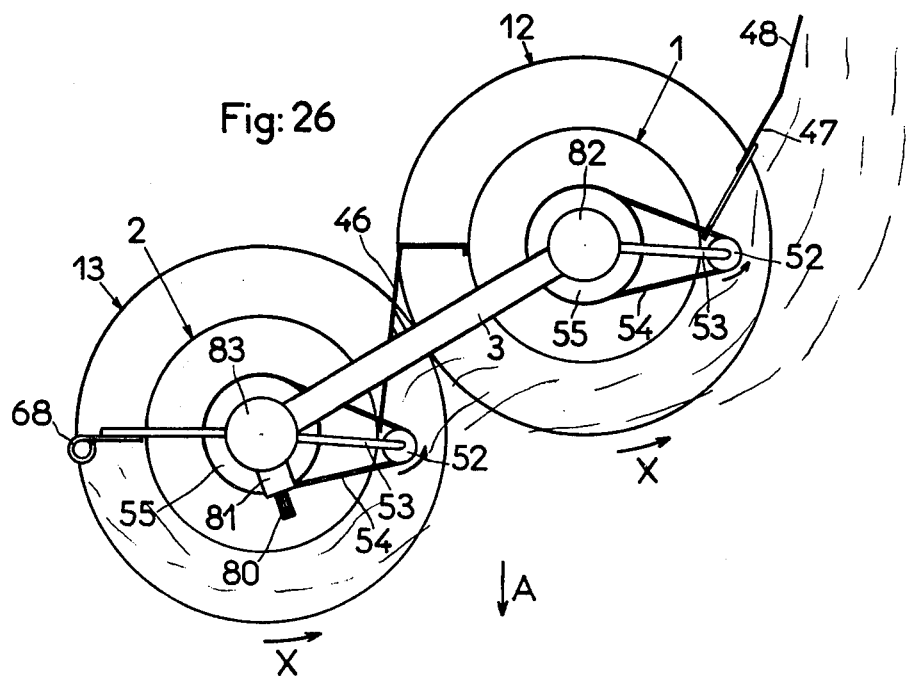
Fig: 26

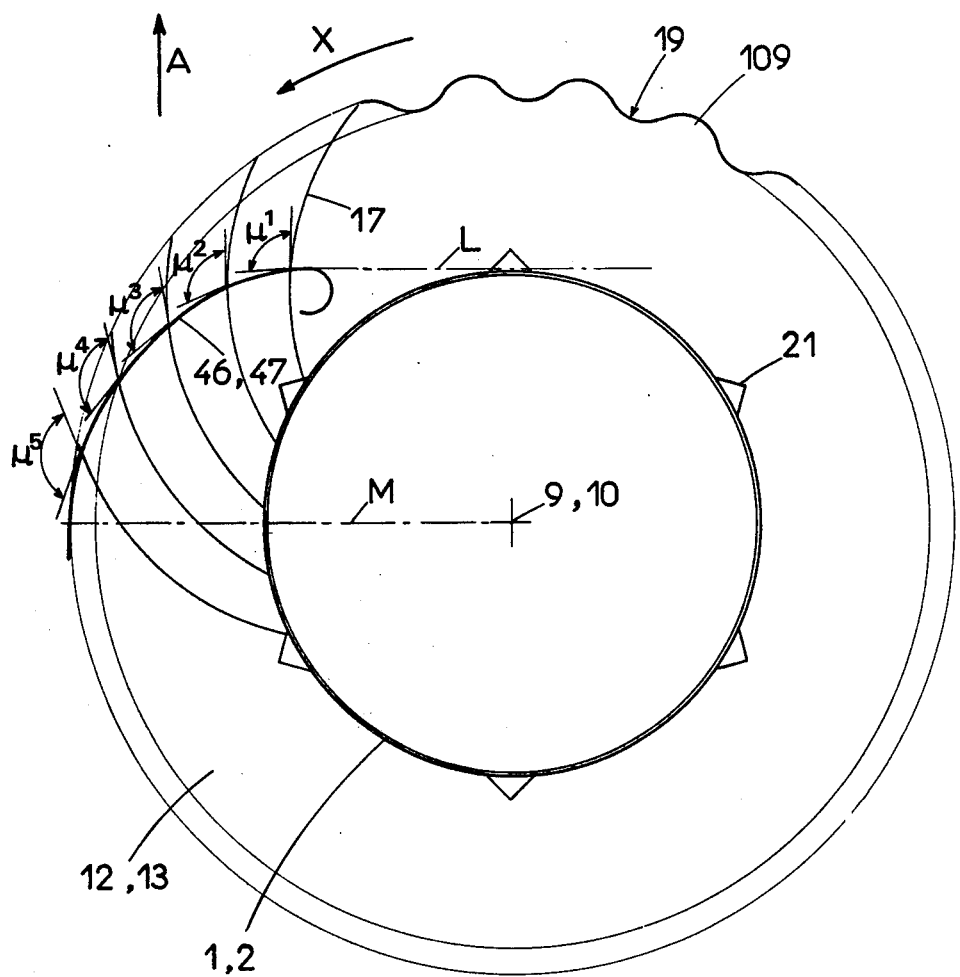
Fig: 27

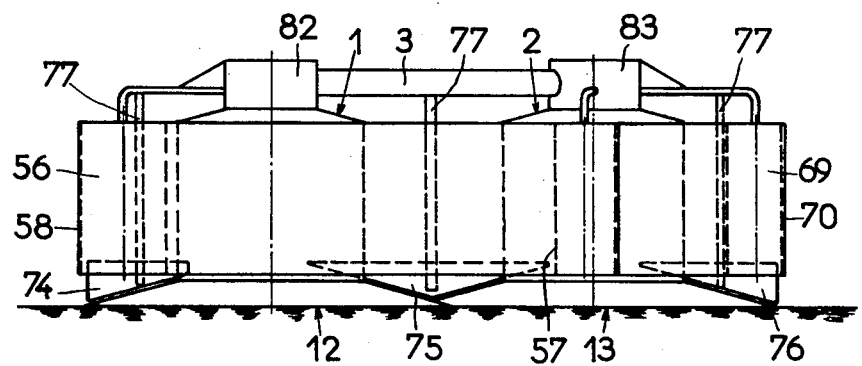
Fig: 28
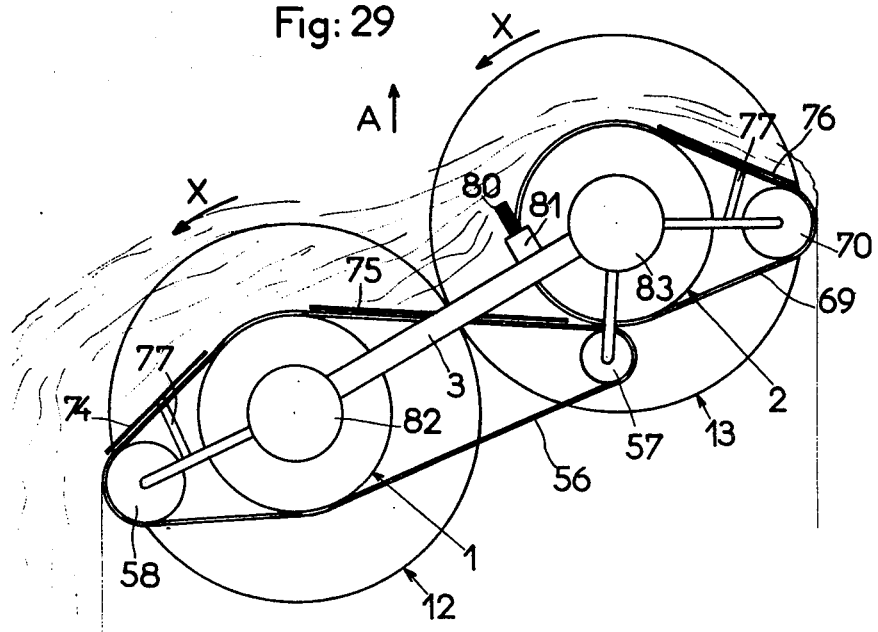
Fig: 29

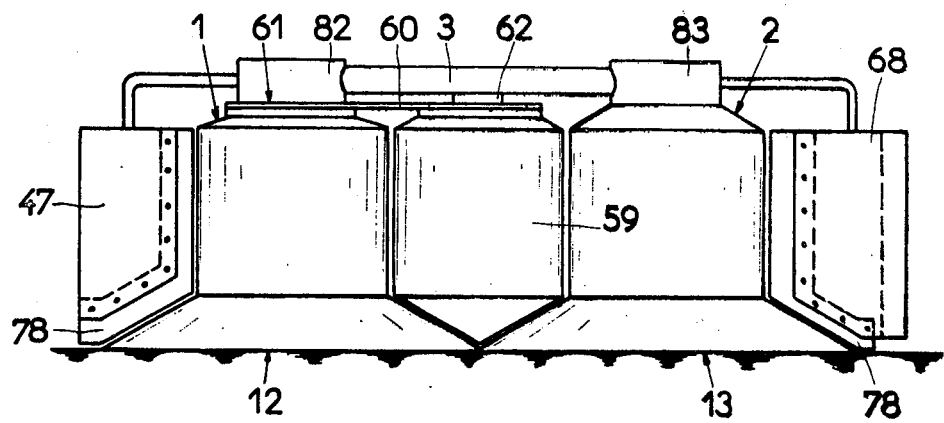
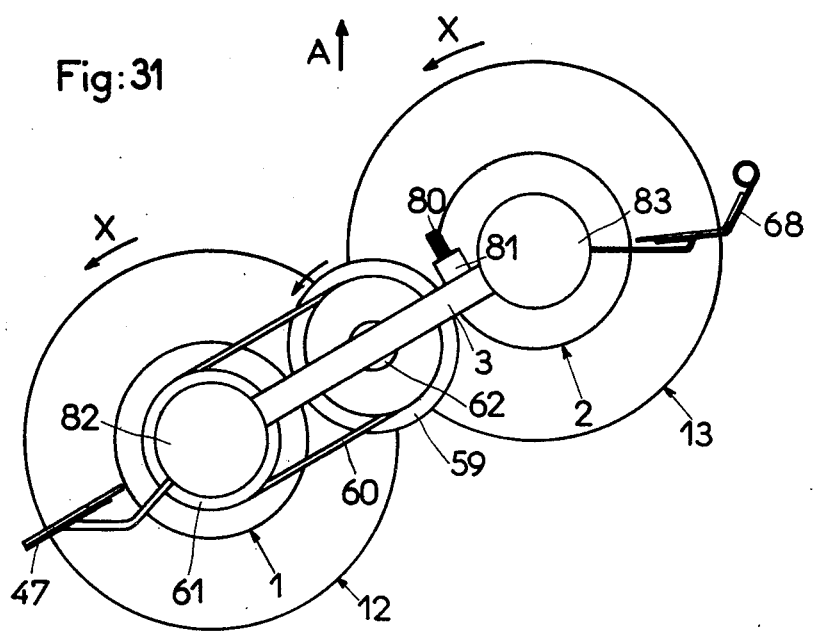

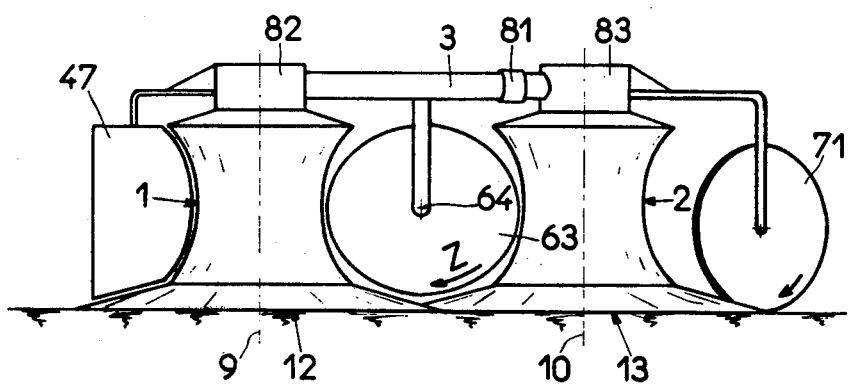
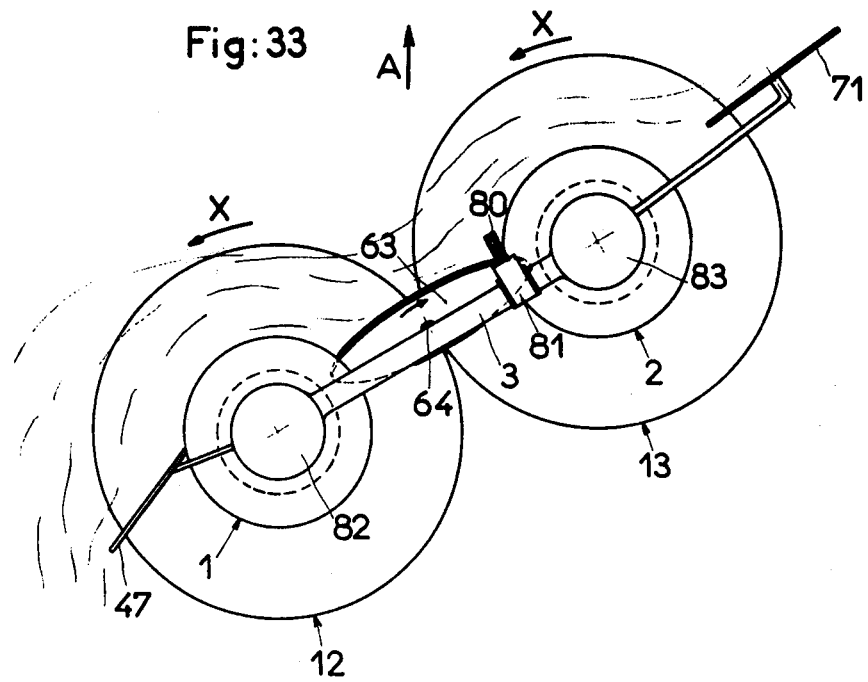

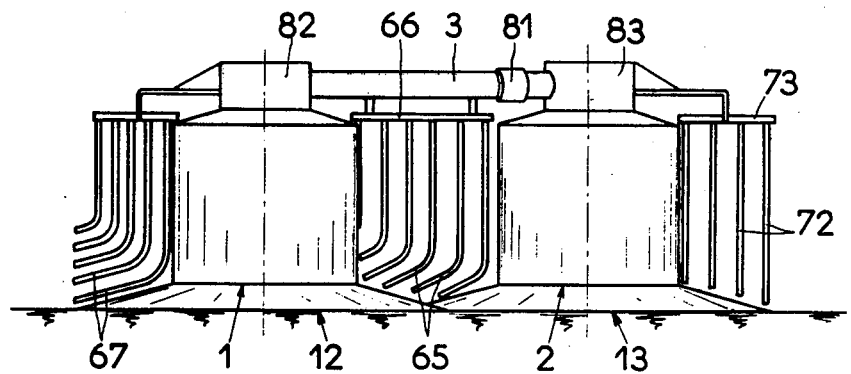
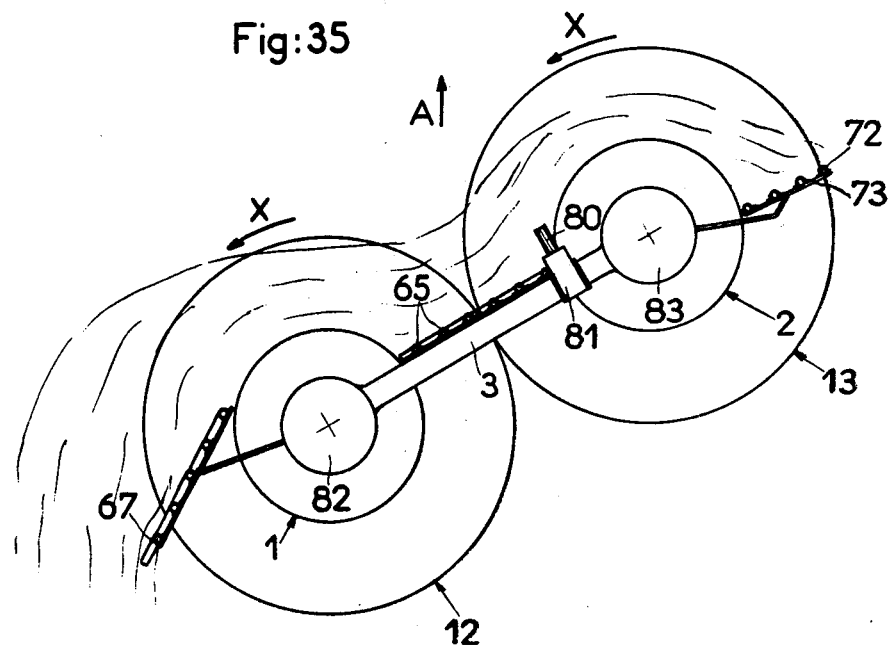

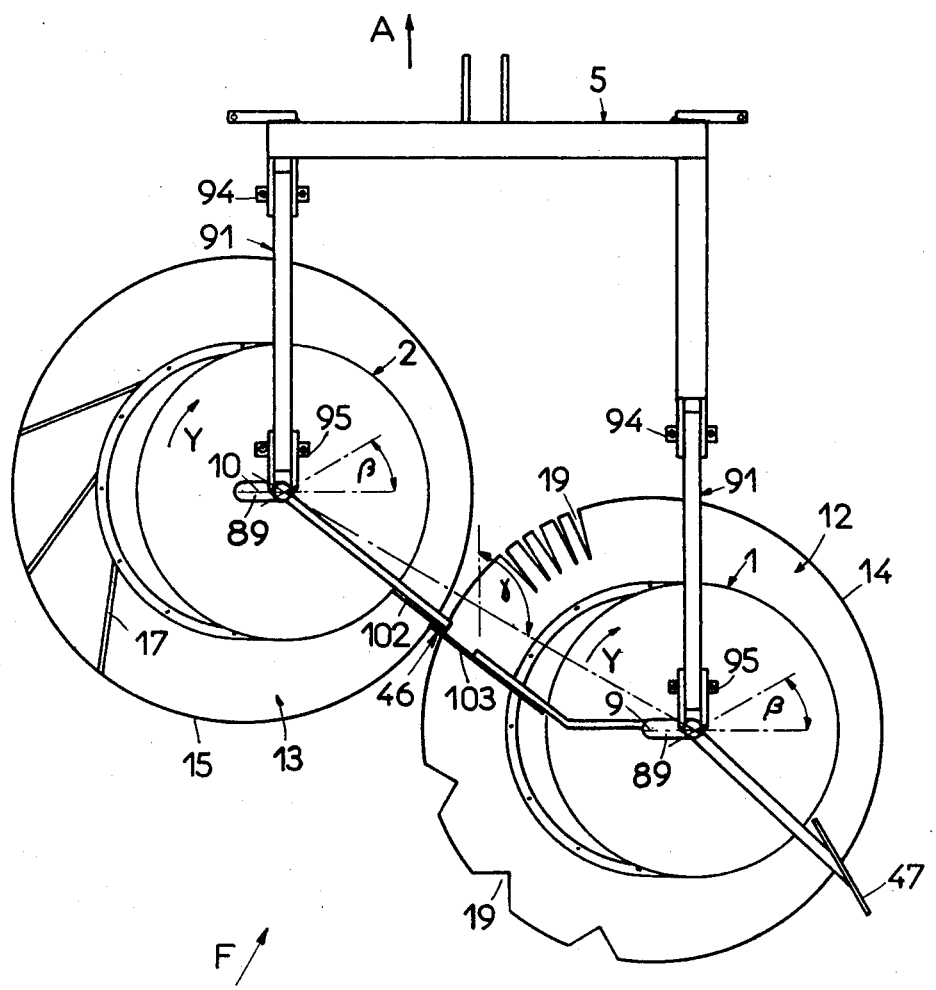
Fig: 36

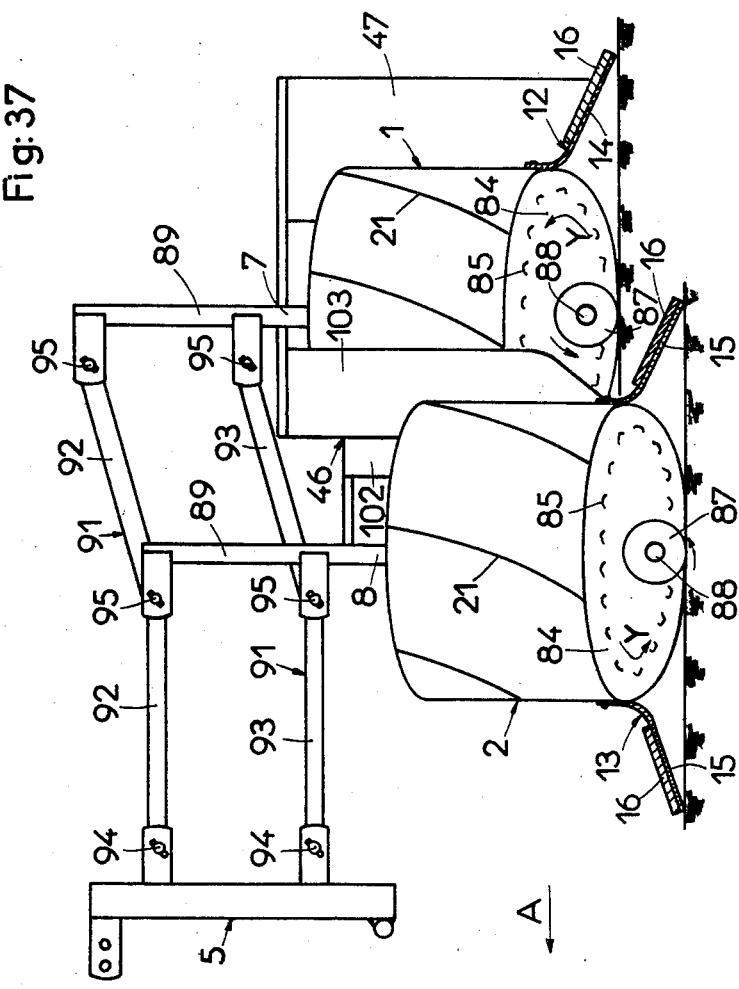

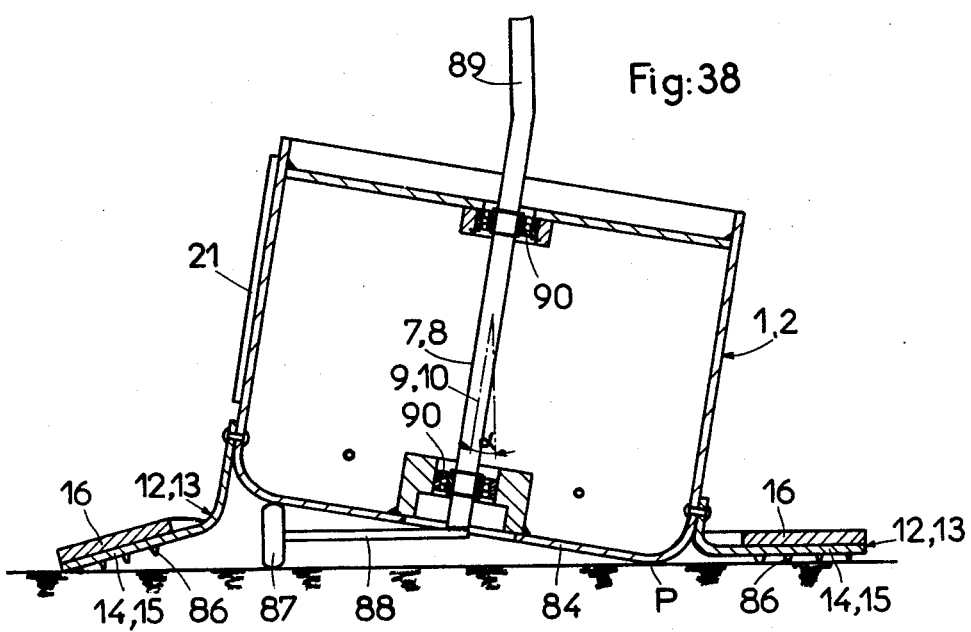

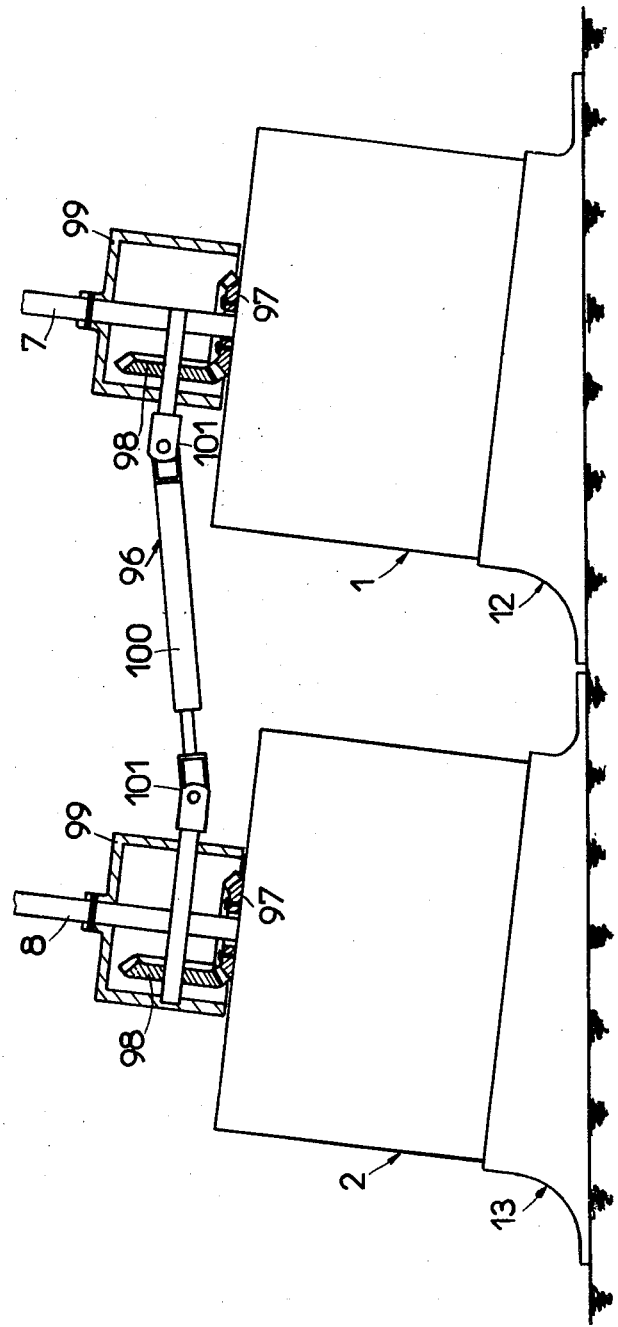

4,203,277

FORKLESS HAYMAKING MACHINE

The present invention relates to a novel type of haymaking machine for the windrowing of fodder, the turning of windrows or for tedding, comprising at least one drum rotating about a substantially vertical or inclined axis.

Up to the present a very large number of types of haymaking machines for the above-mentioned tasks exists. These machines, however, possess one common characteristic: they possess metallic forks or tines or the like elements of variable lengths. These tines, intended to displace the fodder, possess grave drawbacks.

The said tines can in fact be broken without the user being aware of this. In particular on machine having tines which extend radially and substantially parallel with the ground, it frequently occurs that the said tines dig themselves into the ground and break, if the user of the machine omits to cause the rotary rake heads to rotate, before progressing with the tractor. The broken tine is then lost in the fodder which is intended to be collected for example with the aid of a baler or a pick-up chopper. Now the passage of a broken tine into such a machine generally causes very significant damage, the repair of which is extremely lengthy and burdensome, and of course this happens at the precise moment when the user has an urgent need to bring his fodder in one time, while the meteorological conditions are favorable. Thus the tines of haymaking machines constitute a permanent danger for balers and pick-up choppers. Furthermore, these lost tines or pieces of tines are in danger of injuring the animals.

Finally, despite all the precautions which ma ybe taken, the metallic tines of haymaking machines are still quite rough on the one hand towards the cut fodder and on the other towards young growth of vegetation. Now it is known that the more gently the fodder is treated, especially in windrowing, the more it retains its nutrient qualities and the better is the yield.

Furthermore, these tines of known machines generally drag the fodder over the ground during working. For this reason the said fodder is often soiled by the earth, which can cause its rejection by the animals.

Another known machine is provided with flat and pointed teeth integral with the principal part of plate form, of the rotary rake heads. The said principal part can be of sheet metal, rubber or synthetic substances, while the teeth can be of the same material or be fixed thereto in another manner. This machine likewise possesses several of the above-mentioned drawbacks. In fact, the said flat and pointed teeth still act harshly upon the cut fodder and the young growth of vegetation. Moreover, during working these teeth displace the fodder over the surface of the ground, which can involve significant soiling of fodder.

The present invention aims at remedying the above-mentioned drawbacks by proposing a machine as described in the introduction which is free from any risk for the machines or the animals and furthermore treats the cut fodder and the young vegetation growth with extreme gentleness, without casing soiling.

To this end, one important characteristic of the invention consists in that each drum of the machine carries at its base a flexible and deformable skirt of slight thickness which plunges below the fodder to be displaced while closely following the variations of level of the ground, and which transports the said fodder over its upper face in windrowing, the turning of windrows and tedding.

The said skirt can advantageously comprise elements for its stiffening and elements to favor the grasping and/or entraining of the fodder.

In accordance with another characteristic of the invention, the machine can comprise means permitting of regulating the incidence of the skirt of the drum or drums in relation to the ground. These means permit of adapting the machine to the various working conditions which may be encountered. This machine can likewise comprise means controlling the incidence of the skirt in relation to the ground during the rotation of the drum or drums, in order to keep the said skirt in contact with the ground over at least a large sector of its circumference and therefore to permit the skirt to work the whole of the fodder situated in the zone in front of the corresponding drum or drums.

In accordance with another characteristic of the invention, means may be provided on the said machine permitting during working of separating the foreign bodies such as stones which may be situated on the ground from the fodder. The fodder intended to be collected with a harvesting machine such as a pick-up chopper, a baler or a self-loading trailer is thus free from stones or other hard objects which would cause significant damage if they were introduced with the fodder into the said machines.

In accordance with another characteristic of the invention, the machine may comprise several drums carrying a skirt each, which are placed side by side and preferably staggered in relation to one another towards the rear especially for lateral windrowing. In this case, means can advantageously be provided between two adjacent drums so as to facilitate the passing of the fodder from one drum to the other.

According to another characteristic of the invention, laterally of the drum closest to the windrow in formation there may be provided means favoring the disengagement of the fodder from the said drum and its skirt. The said means can further collaborate with the said drum to cause a turning of the fodder in windrowing or with the purpose of effecting a turning of already formed windrows, or even carry out tedding.

Means can likewise be provided laterally of the drum closest to the fodder remaining on the ground beside the machine, on the occasion of a passage with the machine, to facilitate on the one hand the separation between the said fodder remaining on the ground and the fodder taken up by the said drum and/or its skirt, and on the other the entraining of the said collected fodder.

The invention will be explained in greater detail hereinafter by reference to several forms of embodiment of the invention which are illustrated by way of non-limitative example in the accompanying drawings, wherein:

FIG. 1 represents an overall view of a machine according to the invention;

FIG. 2 represents a plan view of a machine according to the invention;

FIG. 3 represents a detail view of a variant of embodiment of the skirt according to the invention, on a larger scale;

FIG. 4 represents a cross section of a projection, along the line IV—IV in FIG. 3;

FIG. 5 represents a longitudinal section of the projections, along the broken line V—V in FIG. 3;

FIG. 6 represents a vertical section, on a larger scale, of a further example of embodiment of the skirt of the drums of the machine;

FIG. 7 represents a partial section of the skirt along the section line VII—VII in FIG. 2;

FIG. 8 represents a section similar to that in FIG. 7, of a variant of embodiment;

FIG. 9 represents a section of a drum according to the invention comprising means for varying the incidence of its skirt in relation to the ground;

FIG. 10 represents a section of a variant of embodiment of means for varying the incidence of the skirt of a drum in relation to the ground;

FIG. 11 represents a partial section of a drum according to the invention comprising means controlling the incidence of its skirt in relation to the ground during rotation of the said drum;

FIG. 12 represents a section of a variant of embodiment of means controlling the incidence of the skirt of a drum in relation to the ground during rotation of the said drum;

FIG. 13 represents a perspective view of a variant of embodiment of a drum;

FIG. 14 represents a plan view of the machine according to the invention, adapted for turning windrows;

FIG. 15 represents a front view of a drum equipped with means permitting of separating the foreign bodies from the fodder during working;

FIG. 16 represents a section along the line XVI—XVI in FIG. 15;

FIG. 17 represents a view similar to FIG. 15 of a variant of embodiment;

FIG. 18 represents a section along the line XVIII—XVIII in FIG. 17;

FIG. 19 represents a plan view of another example of embodiment of means permitting of separating foreign bodies from the fodder during working;

FIG. 20 represents a section along the line XX—XX in FIG. 19;

FIG. 22 represents a section along the section line XXII—XXII in FIG. 21;

FIG. 23 represents an example of embodiment of the extremity of a deflector, on a larger scale, provided with means favoring the taking up of the fodder from a drum;

FIG. 24 represents a variant of embodiment of means favoring the taking up of the fodder from a drum;

FIG. 25 represents a front view of a machine according to the invention equipped with further means favoring the passage of the fodder from the drums to the deflectors;

FIG. 26 represents a plan view of the machine as illustrated in FIG. 25;

FIG. 27 represents a variant of embodiment favoring the clearance of the fodder from the drums and their skirts;

FIG. 28 represents a rear view of a machine according to the invention with a variant of embodiment of the means favoring the lateral windrowing work;

FIG. 29 represents a plan view of the machine as illustrated in FIG. 28;

FIG. 30 represents a view similar to that represented in FIG. 28 of another variant of embodiment;

FIG. 31 represents a plan view of the machine as illustrated in FIG. 30;

FIG. 32 represents a view similar to that represented in FIG. 28, of another variant of embodiment;

FIG. 33 represents a plan view of the machine as illustrated in FIG. 32;

Figure 21:
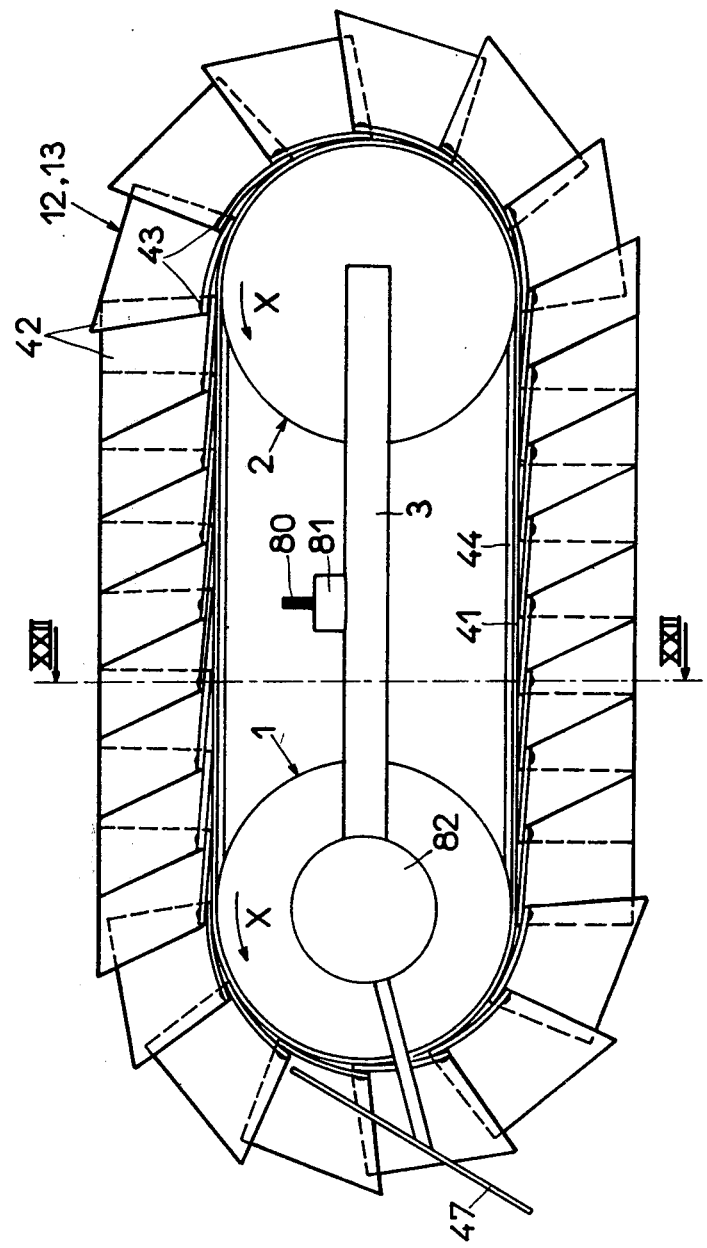
FIG. 21 represents a plan view of a variant of embodiment of a machine according to the invention.

FIG. 34 likewise represents a view similar to that represented in FIG. 28, of another variant of embodiment;

FIG. 35 represents a plan view of the machine as illustrated in FIG. 34;

FIG. 36 represents a plan view of another variant of embodiment of the machine according to the invention FIG. 37 represents a side view of the machine as illustrated in FIG. 36;

FIG. 38 represents a section along a section plane perpendicular to the direction A of travel of one of the drums of the machine as illustrated in FIGS. 36 and 37; and FIG. 39 represents a view in the direction of the arrow F, in partial section, of a variant of embodiment of the machine as illustrated in FIG. 36.

As shown in the drawings, the haymaking machine according to the invention as represented in FIGS. 1 and 2 comprises by way of non-limitative example two substantially identical drums 1 and 2 which are interconnected by a transverse support chassis 3. The latter is connected by means of a connecting beam 4 extending forward to a three-point linkage device 5 permitting coupling of the machine to a propelling tractor as represented in FIG. 1. During working, the machine can move over the ground by means of small wheels 6 or skids placed preferably beneath the drums 1 and 2.

The said drums 1 and 2 are preferably rigid and can be made of sheet metal or plastic material. Each drum 1, 2 is mounted freely in rotation on a central support spindle 7, 8 the lower extremity of which is connected to the wheel 6 or the said skid. During its working each drum 1, 2 rotates about a geometrical axis 9 and 10 which is substantially vertical or slightly inclined to the front and/or to the side. The said forward inclination of the drums 1, 2 can be adjusted as a function of the nature of the work to be carried out, by means of a threaded crank handle 11 which causes the transverse support chassis 3 to pivot in relation to the connection beam 4, when the crank is operated.

According to an essential characteristic of the invention, each drum 1, 2 carries at its base a flexible and deformable skirt 12, 13 of slight thickness which plunges beneath the fodder to be displaced, while closely following variations of level of the ground, and which transports the said fodder over its upper face in working. By virtue of this skirt the fodder is treated gently and is not in contact with the ground during working. In a first example of embodiment, this skirt 12, 13 is formed by a continuous collar 14, 15. It possesses a substantially frusto-conical form and extends all around the corresponding drum 1, 2.

The said skirt 12, 13 can be made of rubber or plastic material or of another analogous material. Its thickness is less than 4 cm so that it can engage beneath the fodder. This thickness is even preferably less than 2 cm. With the purpose of favoring penetrating of the skirt 12, 13 beneath the fodder, its external periphery can be cut in chamfer form. Moreeover, the width l of this skirt 12, 13 can be between 5 and 60 cm, but very good results have been obtained in the course of several tests with a skirt 12, 13 the width of which was between 15 and 45 cm. In order to avoid the skirt 12, 13 being subjected to major deformation or even folding beneath the corresponding drum 1, 2 during working, elements may be added to it to stiffen it while retaining its facility to adapt itself to variations of level of the ground. In order to improve its operation, elements may also be added to it which favor the grasping and/or entraining of the fodder. In certain cases the same elements can advantageously serve simultaneously to effect stiffening of the skirt, 12, 13 and to favor the grasping and entraining of the fodder.

In the example of embodiment as represented in the rear half of the right-hand drum 2—seen in the direction A of travel—of the machine as illustrated in FIG. 2 and in section in FIG. 7, the skirt 13 comprises upwardly directed projections 17 especially to favor the entraining of the fodder. These projections 17 preferably form part of the skirt 13 and are advantageously oriented in the direction opposite to the direction of rotation of the drum 2. They may furthermore have a rectilinear or curved form. By reason of this orientation, the fodder can however easily disengage itself from the said projections 17 in the zone where it is to leave the skirt 13, that is to say on the side of the drum 2. The said projections further effect stiffening of the skirt 13.

In the example of embodiment represented in the forward half of the said right-hand drum 2, the skirt 13 has points 18 on its external periphery to favor the grasping and entraining of the fodder. These points 18 are of very small dimensions and preferably form part of the said skirt 13.

In a variant of embodiment which is represented on the left-hand drum 1—seen in the direction A of travel--of the machine as illustrated in FIG. 2, the skirt 12 is provided with indentations 19 to favor especially the grasping of the fodder. These indentations can be of V-form as represented on the rear half of the said drum 1, or of rounded form as represented on the front half of the said drum 1. In the latter case, the skirt 12 has no sharp angle to which fodder could remain hooked. In the course of tests it has been observed that by virtue of these indentations 19 and the irregular profile which they form on the external periphery of the skirt 12, the latter causes the fodder situated in its range of action to vibrate and thus a passage is easily cleared between the ground and the said fodder.

It is apparent that the above-mentioned elements can be utilized separately or in combination and that the skirts 12 and 13 of the two drums 1 and 2 of the machine may comprise identical elements.

In the variant of embodiment as represented in FIGS. 3, 4 and 5, the indentations 19 and the projections 17 are arranged so that they cause no rejection of fodder towards the rear of the drums 1, 2. In the course of tests it has proved in fact that these elements, which are necessary for good operation of the machine, often entrain the fodder too far to the rear, especially during windrowing and the turning of windrows. The fodder thus entrained is scattered on the ground and no longer collected in the harvest. In order to remedy this, at least the leading flank 108 of each protuberance 109 situated between the indentations 19 of the skirt 12, 13 of the drum 1, 2 possesses a substantially straight portion 110 prolonged on each side by a curved portion 111 and 112. The curved portion 111 extends as far as the apex of the protuberance 109 while the other curved portion 112 extends to the bottom of the indentation 19 (FIG. 3). The radius r of curvature of the curved portion 111 is advantageously smaller than the radius R of the said curved portion 112. By virtue of this form, the leading flank 108 possesses a profile without swelled portion. The fodder therefore slides regularly along the said flank 108 and is not entrained towards the rear of the drum 1, 2.

Moreover, the curved portion 111 extending to the apex of the protuberance 109 is prolonged towards the rear—seen in the direction X of rotation of the drum 1, 2—by a curved portion 113 the radius R1 of curvature of which is greater than the radius r of the said curved portion 111. By virtue of the radius R1 of curvature, the rear flank of each protuberance 109 possesses a swelled portion which prevents the fodder which slides along the outer edge of the skirt 12, 13 from penetrating to the bottoms of the indentations 19 during working. This fodder thus passes directly from the apex of a protuberance 109 on to the straight portion 110 of the following protuberance 109 and thus is no longer entrained too far by the latter. With this same purpose at least the side 114 oriented forwards—seen in the direction X of rotation of the drum 1, 2—of each projection 17 of the upper face of the skirt 12, 13 is inclined upwards and rearwards. This side thus forms an angle λ which is preferably between 20° and 70°, with the upper face of the skirt 12, 13 (FIG. 4). By virtue of this inclined side, the fodder slides easily over the projections 17 and does not remain hooked to them. Moreover, this inclination causes an elevation of the fodder which favors its clearance from the skirt 12, 13 for the formation of a regular windrow.

In FIG. 3, the projections 17 of the upper face of the skirt 12, 13 are curved and extend to the apices of the protuberances 109. Thus they constitute a reinforcement of these protuberances 109 and especially prevent these from folding beneath the skirt 12, 13 when they encounter an obstacle. Furthermore, the forward side 114 of each projection 17 is connected to the leading flank 108 of each protuberance 109. These projections 17 thus increase the height of the leading flank 108, which prevents the fodder from folding around the said flank. Moreover, this arrangement of the projections 17 favors the rise of the fodder over the skirt 12, 13. As appears more particularly from FIG. 5, the extremities of the projections 17 close to the outer edge of the skirt 12, 13 are cut obliquely. Thus, the projections 17 possess no sharp angle to which the fodder could remain hooked and thus be thrown towards the rear of the drum 1, 2. Likewise, the extremities of the projections 17 close to the inner edge of the skirt 12, 13 are cut substantially perpendicularly to the wall of the drum 1, 2. By virtue of this form, the space between the said extremities of the projections 17 and the wall of the drum 1, 2 is relatively large, which avoids encrustation of fodder in this space.

In the example of embodiment as represented in FIG. 6, a crown 16 having rigidity greater than that of the skirt 12, 13 is attached to the skirt to increase its rigidity. The said attachment can be effected by gluing, riveting or another known manner of assembly. This crown 16 prevents the skirt 12, 13 from being deformed too much, while leaving it possible for it to follow the variations of level of the ground closely. For this purpose, it is important that the internal diameter D of the said crown should be greater than the internal diameter E of the skirt 12, 13, so that the internal part of the latter remains cleared and retains all its flexibility. With the purpose especially of favoring entraining of the fodder, the upper face of this crown 16 can be roughened.

In order to increase the wear resistance of the skirt 12, 13 the latter and/or the stiffening elements and/or the elements facilitating the grasping and entraining of the fodder can comprise reinforcements 20 such as metal wires embedded in said skirt and/or the said elements. Such metal wires are visible in FIGS. 6 and 8.

Again, with the purpose of favoring the entraining of the fodder, the walls of the drums 1, 2 can be provided with projections 21 such as ribs. These projections can be formed by the walls of the drums 1, 2, by imparting for example a prismatic form to these, or can be constituted by independent parts attached to the said walls. The said projections can extend vertically, or horizontally, or wind in helical form around the said drums. Moreover, these projections 21 ensure stiffening of the drums 1, 2 (FIG. 2). The above-described skirt 12, 13 can be attached to the base of the corresponding drum 1, 2 for example by gluing, riveting, screwing or even in an easily dismantable manner, by using a kind of press studs or the like. It may further be attached either to the internal face of the drum 1, 2 (FIG. 6), or to its external face. However it can also be attached to the bottom of the corresponding drum 1, 2 or be fixed to an intermediate element 22 which is itself attached to the said drum (FIGS. 10, 11 and 12). These latter solutions possess the advantage that they do not necessitate truing of the internal edge of the skirt 12, 13.

In the examples of embodiment as represented in FIGS. 9 to 12 the skirt 12, 13 comprises means permitting of varying its incidence in relation to the ground, so that it may be adapted to the various working conditions. With this purpose and in accordance with FIG. 9, each drum 1, 2 possesses a flared part at its base. This part, which has the form of a crown 23, extends in a plane substantially perpendicular to the rotation axis 9, 10 of the corresponding drum 1, 2. The edge of this crown 23 is slightly curved downwards. The bottom of each drum 1, 2 is formed by an independent dish 24 of concave form, having a diameter different from that of the said drum. This dish 24 is axially adjustable in relation to the drum 1, 2. Thus the distance separating this dish 24 from the crown 23 of each drum 1, 2 can be regulated. This regulation is effected by means of a threaded rod 25 provided inside each of the drums 1, 2. These threaded rods are fast in translation with the dishes 24 through the intermediary of bearings 26 and cooperate with nuts 27 fast with the drums 1, 2. The skirts 12, 13 of the drums 1, 2 are fixed to their internal faces and extend outwards, passing between the outer edge of the crown 23 and the outer edge of the dish 24 of each drum 1, 2. It appears from FIG. 9 that if the distance between the dish 24 and the crown 23 of the drum 1, 2 is increased with the aid of the threaded rod 25, the angle which the corresponding skirt 12, 13 forms with the ground decreases (position represented in solid lines). To increase this angle it is sufficient to bring the dish 24 closer to the crown 23 of the drum 1, 2 by acting in the opposite direction upon the threaded rod 25 connected to the said dish (position represented in broken lines). This increase is due to the gripping of the skirt 12, 13 between the edge of the crown 23 and the edge of the dish 24, the latter in the example as described being of a smaller diameter than the externaldiameter of the crown 23.

In the case where the skirt 12, 13 is fixed to the outer face of the drum 1, 2, the latter has no crown 23. The dish 24 of this drum 1, 2 is then of a diameter greater than that of the said drum. As the skirt 12, 13 bears upon the edge of the dish 24, it is sufficient to move this dish further from the drum 1, 2 to increase the angle which the said skirt forms with the ground or to bring it closer if the converse effect is desired.

In the example as represented in FIG. 10 the skirt 12, 13 is connected to one of the arms of stirrup pieces 28 disposed at substantially regular intervals. The other arm of each of these stirrup pieces 28 comprises a roller 29 which is guided on a ramp 30 of a crown 31 which can be positioned in relation to the drum 1, 2 by means of a pin 32. All the ramps 30 are substantially identical and form a certain angle in relation to the horizontal. The said rollers 29 are held on their respective ramps 30 by means of compression springs 33. The position of the crown 31 in relation to its drum 1, 2 can be modified by a rotation about the axis 9, 10 of the said drum, after release of the pin 32. As a result of a rotation of the crown 31 in the direction of the arrow N, the ramps 30 exert a traction upon the stirrup pieces 28. This traction causes a pivoting of the stirrup pieces 28 about the fixing points 34 of the skirt 12, 13 on the corresponding drum 1, 2 so that the arms of the said stirrup pieces which are fast with the said skirt entrain the latter downwards and cause an increase of the angle which it forms with the ground (position represented in broken lines). To diminish this angle the crown 31 is subjected to a rotation in the direction opposite to the arrow N so that the stirrup pieces 28 pivot in the converse direction under the effect of the pressure of the springs 33. The arms of the stirrup pieces 28 which are fast with the skirt 12, 13 further effect a stiffening of the latter.

In accordance with another characteristic of the invention, the incidence of the skirt 12, 13 in relation to the ground can be controlled automatically during working. This control permits for example of keeping the skirt 12, 13 in contact with the ground over at least a large sector of its circumference. The latter could in fact tend to rise under the action of centrifugal force resulting from the rotation of the drums 1, 2. Thus in the example of embodiment as represented in FIG. 11, the skirt 12, 13 is connected to one of the arms of stirrup pieces 35 disposed at substantially regular intervals, the other arm of each of which is directed upwards and comprises a weight 36. This weight tends to move away from the rotation axis 9, 10 of the drum 1, 2 under the action of centrifugal force during rotation of the said drum. Thus these weights 36 pivot the stirrup pieces 35 about the fixing points 34 of the skirt 12, 13 on the drum 1, 2 so that their arms fast with the said skirt press the latter downwards and keep it in contact with the ground over at least its forwardly directed part-seen in the direction A of travel—that is to say its active part. Moreover, means such as stops may also be provided to guide the said weights in such manner that the part of the skirt 12, 13 which is directed towards the rear of the machine remains spaced from the ground, to avoid excessive wear of the said skirt.

In the example of embodiment as represented in FIG. 12, the position of the skirt 12, 13 is controlled by a non-rotating cam 37 fixed on the support spindle 7, 8 of the drum 1, 2. The said skirt 12, 13 is preferably articulated to the corresponding drum 1, 2 by means of intermediate elements 22 and can pivot easily in relation to the drum about the articulations 38. Moreover, the said skirt 12, 13 comprises pivots 39 disposed at substantially regular intervals, one of the extremities of which is fast with the said skirt and the other extremity comprises a roller 40 which is guided in the said cam 37. The profile of this cam 37 is arranged so that during the rotation of the drum 1, 2 it causes the pivots 39 to pivot about the articulations 38 of the skirt 12, 13 on the drum 1, 2 so that their extremities fast with the said skirt maintain the latter in contact with the ground over at least its forwardly directed part—seen in the direction A of travel. This arrangement is particularly advantageous in the case where the drum 1, 2 and the skirt 12, 13 are inclined forward or to the side, since the said control permits then of guiding the said skirt 12, 13 so that it retains contact with the ground over the whole of the forward half of its trajectory, so that it can work the whole of the fodder situated before the drum 1, 2.

The drums 1, 2 as described above can have a cylindrical form (FIG. 1). However they can equally have substantially the form of a cone frustum the generatrices of which are rectilinear or curved and the imaginary apex of which is directed downwards, as represented in FIG. 13. By virtue of this form, the fodder is constantly pushed downwards so that even when it is very dense there is no risk of it passing over the top of the drums 1, 2. Moreover, since at the upper part of the substantially frusto-conical drums 1, 2 the circumferential velocity is greater than at their bases, these drums impart an inverting movement to the fodder. This movement can be amplified by adding a collar of a diameter larger than that of the drum 1, 2 to the upper part of the latter. This collar can even be provided with ribs on its lower face to increase its engagement with the fodder. This form of embodiment is perfectly suitable for the turning of windrows, as represented in FIG. 14. Tedding of fodder can be effected in the same manner.

In accordance with another characteristic, the machine according to the invention can comprise means 104, 105, 106 permitting of separating foreign bodies such as stones from the fodder during working. This is particularly important in windrowing or the turning of windrows in order to avoid the possibility of such bodies, mixed with the fodder, penetrating into harvesting machines with which the windrowed fodder is collected.

In the example of embodiment as represented in FIGS. 15 and 16, the skirt 12, 13 of the drum 1, 2 comprises apertures 104 for the separation of foreign bodies from the fodder.

In fact, when during working such a body slides on to the skirt 12, 13 of the drum 1, 2, it automatically comes into contact with the skirt by reason of its weight, which is greater than that of the fodder. Then, as soon as it arrives at the level of one of the apertures 104, it passes through the latter and drops back onto the ground behind the line of working of the drum 1, 2. This body is thus separated from the fodder which remains on the upper face of the skirt 12, 13 of the drum 1, 2 by reason of the fact that its length is greater than the size of the aperture 104 and that its weight is very low. The said apertures 104 are advantageously situated in the vicinity of the wall of the drum 1, 2 so that the space between the skirt 12, 13 and the ground, in the region where the said apertures 104 are situated, is sufficiently large for the passage of bodies of quite large volume.

In the example of embodiment as represented in FIGS. 17 and 18 the drum 1, 2 comprises apertures 105 in its wall. These are situated at the lower part of the drum 1, 2 and preferably just above the skirt 12, 13. Thus foreign bodies which come and place themselves flat against the said wall during working pass through the said apertures 105 and drop onto the ground behind the working line of the skirt 12, 13. As represented in FIGS. 17 and 18 the apertures 104 and 105 mentioned above can advantageously be combined.

In the example of embodiment as represented in FIGS. 19 and 20, the outer part of the skirt 12, 13 is formed by rounded tongues 106 of elongated form, for the purpose of permitting the separation of foreign bodies from the fodder. These tongues 106 extend substantially over half of the width of the skirt 12, 13 and are in contact with the ground over only a part of their length. Thus there are apertures 107 between them through which the foreign bodies pass. These bodies thus remain practically on the ground while the fodder which is lighter slides over the inner part of the skirt 12, 13 and is transported on its upper face. By virtue of their rounded form, the said tongues 106 are not harsh to the cut fodder and young vegetation growth. Moreover, these tongues 106 are oriented in the direction opposite to the direction X of rotation of the drum 1,2. Therefore, the foreign bodies slide in a certain manner along the tongues 106 and are not grasped by them. Moreover, by virtue of their orientation, the fodder does not remain hooked to the said tongues 106.

In the variant of embodiment as illustrated in FIGS. 21 and 22, the skirt 12, 13 is formed by a belt 41 guided by two drums 1, 2 and comprising at its base a plurality of tongues 42 which overlap and are directed obliquely towards the ground. These tongues 42 therefore form a continuous collar. This skirt 12, 13 thus constituted can possess the characteristics already described above. The tongues 42 are fixed to the belt 41 by means of rivets 43. This belt 41 can advantageously comprise one or more ribs 44 guided in grooves 45 of the drums 1, 2 so as to be axially immobilized on the latter.

For lateral windrowing several drums 1, 2 according to the invention are placed side by side and preferably staggered in relation to one another towards the rear so that the fodder is transferred from one drum to the other and deposited in the form of a windrow laterally of the machine. In this position the line connecting the rotation axes 9 and 10 of the two drums 1, 2 forms an obtuse angle γ preferably between 110° and 140°, with the direction A of travel of the machine (FIG. 2). Moreover, the rotation axes 9 and 10 of the said drums 1, 2 are inclined slightly forward by an angle between 4° and 10° in relation to the vertical, in a plane substantially parallel with the said direction A of travel of the machine. By virtue of the above-mentioned staggering of the drums 1, 2, the trajectories described by their respective skirts 12, 13 partially overlap, in order to avoid losses of fodder between the said drums. With this same purpose the said skirts 12, 13 can practically touch one another or even partially pass one above the other. In this case the skirt 12 of the drum 1 further to the rear passes below the skirt 13 of the more forward drum 2.

In accordance with an important characteristic of the invention, means are disposed between the adjacent drums 1, 2 to facilitate the passage of the fodder from one of the said drums to the other in the formation of a lateral windrow. These means guide the fodder from the drum 2 which is further forward towards the drum 1 which is further to the rear, so that there are no losses between the said drums. In a first example of embodiment as represented in FIGS. 1, 2, 25 to 27 and 36, the said means are constituted by a deflector 46 connected to the transverse support chassis 3. This deflector extends from the upper face of the skirts 12 and 13 of the drums 1 and 2 substantially to the upper level of the said drums. This deflector 46 thus blocks the space existing between the drums 1 and 2. The said deflector 46 can advantageously be elbowed in the form of a V the point of which is directed towards the rear of the machine—seen in the direction of travel A of the machine. By virtue of this form, the deflector 46 extends between the two drums 1 and 2 and passes behind the zone in which their skirts 12 and 13 are close to one another and transfer the fodder. Moreover one of the arms of this angled deflector 46 is preferably substantially tangential to the drum 2 from which it receives the fodder, so that the passage of the said fodder over the deflector takes place under optimum conditions, while the other arm is directed substantially radially of the drum 1 to which it transmits the fodder, so that this drum and its skirt 12 may have a good grip upon the said fodder.

In accordance with a further characteristic of the invention, means favoring the clearance of the fodder from the drum 1 which completes the formation of the windrow during working, also the formation of the said windrow, are disposed laterally of this drum. In the examples of embodiment as represented in FIGS. 1, 2, 13, 14, 21 to 27, 30 to 33 and 36 these means are constituted by a lateral deflector 47 which intercepts the fodder transported by the drum 1. It is connected to the transverse support chassis 3 and extends laterally of the drum 1 from the upper face of its skirt 12 substantially to the upper level of the said drum. Moreover the said deflector 47 is substantially tangential to the said drum 1 and its side closer to the said drum substantially matches the profile of the drum. This arrangement therefore presents no obstacle which could impede the flow of fodder. Moreover the side of this lateral deflector 47 more remote from the drum 1 may be slightly incurved so as to cause a turning of the fodder as effected by a plough when it turns the earth during ploughing. The said side can advantageously be constituted by flexible rods 48 which further effect a slight heaping of the windrow (see FIG. 13). This arrangement can also be suitable for executing tedding.

The deflector 46 situated between two adjacent drums 1 and 2 and the lateral deflector 47 mentioned above advantageously comprise, close to their edge towards the drums 1 and 2 which transmit the fodder to them, means which facilitate this transmission. These means can be constituted by packings 49 preferably of a flexible material. These packings 49 are fast with the said deflectors and sweep the drums 1 and 2 which transmit the fodder to the said deflectors 46 and 47 (see FIG. 23). The fodder therefore cannot engage between the deflectors 46 and 47 and the corresponding drums 1 and 2.

In the example of embodiment as represented in FIG. 24 the deflectors 46 and 47 comprise, on the said edges facing the drums 1 and 2, tabs or lugs 50 which engage in grooves 51 extending all around the drums 1 and 2. Thus, even fodder which is practically stuck against the walls of the drums 1, 2 is disengaged by the lugs 50 and passes over the deflectors 46 and 47. The said grooves 51 further effect a stiffening of the drums 1 and 2.

In the example of embodiment as represented in FIGS. 25 and 26, the means for favoring the passage of the fodder from the drums 1 and 2 onto the deflectors 46 and 47 are constituted by rollers 52. These extend parallel with the drums 1, 2 and are disposed before the said deflectors. They are mounted freely in rotation on support arms 53 which are connected to the support chassis 3. These rollers 52 can be driven in rotation in the same direction as the drums 1, 2 either solely by the flow of fodder or from the said drums for example by means of belts 54 passing over pulleys 55 fast with the said drums. The lower extremities of these rollers 52 can be conical so that they at least partially match the form of the skirts 12, 13 of the drums 1, 2 and remove the fodder from these skirts.

In the variant of embodiment represented diagrammatically in FIG. 27, the deflector 46 or 47 disposed partly above the skirt 12, 13 of the drum 1, 2 is arranged so that no jamming of fodder occurs between the base of this deflector and the projections 17 of the upper face of the skirt 12, 13. To this end, with the said projections 17, it forms an angle $\mu$ which is increased as one approaches the outer edge of the said skirt 12, 13. In FIG. 27, which represents a projection 17 in five different positions in relation to the deflector 46 or 47, it is seen that the increase of the angle $\mu$ is constant as the said projection passes beneath this deflector 46 or 47. By virtue of this characteristic the fodder retained by the base of the deflector slides automatically outwards under the thrust of the projections 17, without jamming occurring.

In the example of embodiment as represented, the deflector 46 or 47 extends along a curve which departs from the wall of the drum 1, 2 progressively as it is directed towards the rear—seen in the direction A of travel of the machine. The rear part of this deflector 46 or 47 can then be prolonged in a straight line or be directed towards an adjacent drum, as described above. The said curvature of the deflector 46 or 47, seen from above, starts substantially at the level of a line L perpendicular to the direction A of the travel of the machine and tangential to the forward face of the wall of the drum 1, 2. Furthermore, the said curvature departs from the skirt 12, 13 substantially at the level of a line M parallel with the said line L and passing substantially through the axis 9, 10 of rotation of the drum 1, 2. The forward part of this deflector 46 or 47 is advantageously recurved so as not to present any sharp angle to which the fodder could become hooked.

In the example of embodiment as illustrated in FIGS. 28 and 29, the means to favor the passage of the fodder from one drum to the other are constituted by a conveyor belt 56. This conveyor belt 56 passes over the drum 1 and is driven by it. It is further guided by a roller 57 substantially parallel with the drums 1, 2 and connected to the support chassis 3. This roller is placed behind the drum 2 from which the fodder comes. In this example the conveyor belt 56 further favors the clearance of the fodder from the drum 1 which completes the formation of the windrow. For this purpose, it is guided by a second roller 58 connected to the support chassis 3. This roller 58 is placed laterally of the said drum 1 and is substantially parallel thereto. In this arrangement it is preferable that the forward run of the conveyor belt 56 which is in contact with the fodder should pass partially behind the drum 2 from which the fodder comes and before the drum 1 which receives the said fodder and deposits it in the form of a lateral windrow. In this way the zone in which the skirts 12 and 13 of the drums 1 and 2 are close to one another and transmit the fodder to one another is situated at least partially in front of the said forward run of the conveyor belt 56 so that the passage of the fodder from one skirt to the other is effected without the fodder coming into contact with the ground again. Finally, this conveyor belt 56 can be provided with ribs or the like to favor the entraining of the fodder.

In the example of embodiment as represented in FIGS. 30 and 31, an intermediate drum 59 is provided between the two drums 1 and 2 to favor the transmission of the fodder from one of the said drums to the other. This intermediate drum 59 is substantially parallel with the drums 1 and 2 and is driven in rotation in the same direction as these, either by the flow of the fodder or from one of the said drums for example by means of a belt 60 passing over a pulley 61 fast with the said drum which effects the drive. For this purpose, the intermediate drum 59 is guided in rotation on a spindle 62 connected to the transverse support chassis 3 of the drums 1 and 2. Moreover, the base of the said intermediate drum is conical and at least partially matches the form of the skirts 12, 13 of the drums 1, 2 in order to collaborate with these for the transmission of the fodder.

In the example of embodiment as represented in FIGS. 32 and 33, the means to favor the passage of the fodder from one drum to the other are constituted by a wheel 63 situated substantially between the said drums 1 and 2. This wheel 63 is mounted freely in rotation on a substantially horizontal or slightly downwardly inclined spindle 64 about which it is driven in rotation by the flow of fodder in the direction of the arrow Z. However this wheel 63 can also be driven mechanically in rotation for example from one of the drums 1, 2. The said spindle 64 is prolonged upwards and connected to the transverse support chassis 3 of the machine, passing behind the said wheel 63—seen in the direction A of travel—in such a way as not to impede the passage of the fodder from one drum to the other.

By virtue of the said downward inclination of the rotation axis 64, the wheel 63 is situated in a forwardly inclined plane. Its lower part therefore passes substantially behind the zone in which the skirts, 12, 13 of the drums 1 and 2 transfer the fodder and each of its lateral parts—seen from above—moves substantially in the direction of rotation of the closer drum 1 or 2, which favors on the one hand the clearance of the fodder from the drum 2 and on the other the taking up of the fodder by the drum 1 (see FIG. 33).

Moreover, to avoid any loss of fodder between the wheel 63 and the drums 1 and 2, the latter can be of concave form in order approximately to follow the profile of the said wheel.

In the example of embodiment as represented in FIGS. 34 and 35, the means for favoring the passage of the fodder from one drum to the other are constituted by flexible rods 65. These rods can be made of spring steel, rubber or plastic material. They are fixed on a support 66 itself connected to the transverse support chassis 3 of the machine. At least the lower part of these flexible rods 65 is oriented towards the drum 1 which collects the fodder, in order to guide the said fodder towards this drum.

In this example of embodiment the means which simultaneously favor the clearance of the fodder from the drum 1 which completes the formation of the windrow and the formation of this windrow are likewise constituted by flexible rods 67 analogous with the aforementioned rods 65. The lower extremities of these flexible rods 67 are oriented towards the exterior and the rear of the machine.

According to another characteristic of the invention, means which facilitate on the one hand the separation between the fodder remaining on the ground and the fodder taken up by the machine in working and on the other hand the entraining of this fodder are disposed laterally of the drum 2 which is placed further forward and nearer to the said fodder remaining on the ground. These means especially prevent fodder from sliding over the skirt 13 of the drum 2 and dropping back onto the ground to the rear of the machine. Moreover, by virtue of these means, the said separation occurs over a straight line, which avoids the necessity of the user pursuing a zig-zag course over the ground to follow the line of separation in the next passage. In FIGS. 2, 14, 25, 26, 30 and 31 the said means are constituted by a deflector 68 connected to the transverse support chassis 3 and extending from the upper face of the skirt 13 of the said drum 2 substantially to the upper level of the latter. This deflector 68 extends obliquely towards the exterior from the drum 2 with which it is associated and its external extremity is rounded in such manner as to have no sharp angle on which the fodder could remain hooked.

In the example of embodiment as represented in FIGS. 28 and 29, the said means to facilitate the separation between the fodder remaining on the ground and the fodder taken up by the machine, and which facilitate the entraining of this latter fodder, are constituted by a conveyor belt 69. This passes both over the forward run 2 and over a roller 70 disposed substantially parallel with and laterally of the said drum. Thus this drum drives the conveyor belt 69 in the same direction as its direction of rotation. The said roller 70 is fixed on a support arm connected to the transverse support chassis of the machine.

In another example of embodiment represented in FIGS. 32 and 33, the means to facilitate the separation between the fodder remaining on the ground and the fodder taken up by the machine are constituted by a wheel 71. This is placed slightly before the forward drum 2 in a plane transverse to the direction A of travel of the machine. The said wheel 71 can rotate about a substantially horizontal axis and is advantageously driven in rotation by its friction on the ground during working.

In the example of embodiment represented in FIGS. 34 and 35, these means to facilitate the separation between the fodder remaining on the ground and the fodder taken up by the machine, and which favor the entraining of this fodder, are constituted by flexible rods 72 which extend substantially parallel with the drum 2. These rods are analogous with the aforementioned rods 65. They are fixed to a support 73 which is connected to the transverse support chassis 3 of the machine.

In the variants concerning the conveyor belts 56 and 59 and illustrated in FIGS. 28 and 29, deflectors 74, 75, 76 are provided to block the space existing between the bases of the said conveyor belts and the upper faces of the skirts 12 and 13 of the drums 1 and 2. The said deflectors are advantageously made of a flexible and deformable material such as rubber, in order not to damage the skirts 12 and 13 of the said drums if these should come into contact with these deflectors. The latter are fixed to support arms 77 which are connected directly or indirectly to the transverse support chassis 3, passing behind the forward runs of the conveyor belts 56 and 59.

Again with the purpose of causing no deterioration to the drums 1, 2 and or their skirts 12, 13 in case of contact, at least the sides of the lateral deflectors 47 and 68 and of the central deflector 46 which are directed towards the said drums, also their bases which are close to the said skirts, are made of a flexible and deformable material. With this aim the said parts of the deflectors 46, 47 and 68 can likewise be lined with strips or plates 78 of rubber or plastic material which are attached to the said deflectors by gluing, riveting or another analogous method of securing (FIGS. 1 and 30).

In the examples of embodiment as represented in FIGS. 1 to 35, the drums 1, 2 are driven in rotation in the direction of the arrows X by the power take-off of the towing vehicle. This drive is effected in a manner known per se by a Cardan shaft 79, represented in FIG. 1, connecting the power take-off shaft of the said vehicle to an intermediate shaft 80 extending in a gearbox 81 of a transverse support chassis 3. The said intermediate shaft in turn, by means of bevel pinions housed in the box 81, drives a longitudinal shaft which is preferably disposed in the transverse support chassis 3 and comprises at each of its extremities a bevel pinion which is in mesh with a toothed rim fast with the corresponding drum 1, 2. These bevel pinions and toothed rims are lodged in the boxes 82 and 83 of the transverse support chassis 3. However, since the drums 1 and 2 do not necessitate synchronized rotation, they can advantageously be driven at different rotation speeds. Thus, the drum 1 which works the larger volume of fodder can be driven at a higher rotation speed than the drum 2, in order to avoid an accumulation of fodder on the said drum 1. The rotating drive of the drums 1, 2 from the gear box 81 can likewise be effected by means of belts.

In the example of embodiment as represented in FIG. 21, it is sufficient to drive only one of the drums 1, 2 carrying the belt 41.

In the example of embodiment as represented in FIGS. 36 to 39, the drums 1, 2 equipped with a skirt 12, 13 each are driven in rotation in the direction of the arrows Y by the ground. These drums for this purpose possess a bottom portion 84 having a ground contact zone P, by virtue of which the movement of the machine in its direction A of travel causes rotation of the drums 1, 2 about their respective geometric rotation axes 9, 10. For this purpose these axes are slightly inclined by an angle $\alpha$ in relation to the vertical towards the side on which the windrow forms. Without detriment to the good operation of the machine, each of these axes 9, 10 of the drums 1, 2 can then be places in a vertical plane situated in the sector defined by the angles $\beta$ represented in FIG. 36. To improve the ground adhesion of the bottom portion 84, it can be equipped with small projections 85 visible in FIG. 37. Moreover to improve the ground adhesion of the skirts 12, 13, although these do not have the essential function of effecting the drive of the drums 1, 2, it is possible to equip their lower faces with points 86 of small dimensions (FIG. 38) which are preferably made integral with the skirts 12 and 13.

In the above-described example of embodiment, each of the drums 1, 2 of the machine according to the invention bears on the ground by means of a single contact zone P with the essential purpose of effecting the rotating drive of the skirts 12, 13 on displacement of the machine. According to a variant of embodiment as represented in FIGS. 37 and 38, a small wheel 87 connected by an arm 88 to the support spindle 7, 8 of each drum 1, 2 likewise bears on the ground. These wheels 87 are oriented in a plane parallel to the direction A of travel of the machine. Moreover they are substantially diametrically opposite to the contact zone P of the drums 1, 2 with the ground and serve to bear upon the bottom 84 of each of the said drums. This permits of further improving the quality of the drive of the drums 1 and 2 since their bottom portions bear simultaneously upon the ground by means of the above-mentioned contact zone P and upon the wheel 87 which thus contributes to the said drive.

FIG. 38 likewise shows the manner in which the drums 1, 2 are mounted on their support spindles 7 and 8. These, which are inclined at an angle $\alpha$ in relation to the vertical, comprise an upper part 89 substantially perpendicular to the ground and connected to the support chassis of the drums. The lower parts of the spindles 7 and 8 are prolonged horizontally in relation to the ground and constitutes the arms 88 of the wheels 87. The inclined intermediate part of each of these spindles 7 and 8 is provided at its extremities with roller bearings 90 permitting rotation of the respective drums 1 and 2. Without detriment to the reliability of the machine according to the invention, these roller bearings 90 can be replaced by simple rings, in view of the lightness of the drums 1 and 2 and their low rotation speed. A device can likewise be provided permitting the drums 1, 2 to shift in height along their support spindles 7, 8 in order to follow variations of level of the ground.

According to another characteristic of the invention, each drum 1, 2 is separately connected to the coupling device 5 by means of elements 91 which permit the said drums 1 and 2 to retain their positions in relation to the ground and individually to follow variations of level of the ground. With this purpose, the said elements 91 are made in the form of parallelograms, as may be seen from FIG. 37 which represents a machine according to the invention in which the drums 1 and 2 are not at the same level. Each of these parallelograms comprises two link rods 92 and 93 respectively articulated at their extremities about axes 94 and 95 situated on the one hand on the coupling device 5 and on the other on the upper parts 89 of the support spindles 7 and 8 of the drums 1 and 2. Without departing from the scope of the invention it will of course be possible to dispose these parallelograms in a manner other than that represented. These parallelograms likewise comprise locking devices (not shown) which permit of neutralizing them so that it is possible to lift the machine into a transport position, by virtue of the hydraulic hoist device of the propelling vehicle utilized for the operation of the machine.

As the machine according to the example of embodiment as described above is designed essentially to be capable of being put into operation by simply being driven by the ground, it can occur that on passing over a slippery zone one of the drums 1, 2 no longer rotates and commences to skid. In order to avoid this, in accordance with FIG. 39 the two drums 1 and 2 have been connected by means of transmission elements 96 such for example as a telescopic shaft 100. In this Figure it is seen that each drum 1 and 2 is provided in its upper part with a toothed rim 97. Each of these rims 97 meshes with a bevel pinion 98. Each bevel coupling 97, 98 is lodged in a box 99 fixed to the support spindle 7, 8 of each of the drums 1, 2. The bevel pinions 98 are judiciously placed in relation to their rims 97 so that the telescopic shaft 100 connecting these pinions 98 may drive the drums 1 and 2 in the same direction. In order to permit the telescopic shaft 100 to drive the drums 1 and 2 whatever is the position of these latter, the said shaft 100 is provided with a Cardan joint 101 at its extremities.

Such an arrangement for example permits the drum 1 or 2 to be driven in rotation even when it is passing over a slippery zone or when its ground adhesion becomes too slight to effect its drive.

Since the adjacent drums 1 and 2 can shift in relation to one another it is important that the deflector 46 disposed between these two drums 1 and 2 can follow them in their displacements. For this purpose it is advantageously made in two parts 102, 103 each of which is connected to one of the drums 1, 2.

Without departing from the scope of the invention it is possible to place the above-described windrowing drums to the front or the rear of a machine intended for harvesting fodder, as for example a self-loader, a pickup chopper, a baler, a mower or a mower-conditioner, especially with the purpose of reducing the width of a windrow of mown fodder.

Although the attached drawings represent machines having two drums it is apparent that the number of drums can be modified and the form of the drums can be varied, as also can the relative position, without departing from the scope of the invention. Likewise it will of course also be possible to effect various modifications, improvements or additions to the different variants of embodiment as described, without thereby departing from the scope of the invention.

What is claimed is:

1. A haymaking machine for the windrowing of fodder or the turning of windrows or for tedding, comprising at least one drum rotating about a substantially vertical or inclined axis, said drum (1, 2) carrying at its base a thin flexible and deformable skirt (12, 13) which plunges beneath the fodder to be displaced while closely following the variations of level of the ground, and which transports the said fodder over its upper face.

2. A machine according to claim 1, in which the skirt (12, 13) comprises a continuous collar (14, 15) of substantially frusto-conical form which extends all around the drum (1, 2).

3. A machine according to claim 1, in which the thickness of the skirt (12, 13) is less than 4 cm.

4. A machine according the claim 3, in which the external periphery of the skirt (12, 13) is chamfered.

5. A machine according the claim 1, in which the width (1) of the skirt (12, 13) is between 5 and 60 cm.

6. A machine according to claim 1, in which the skirt (12, 13) comprises elements for its stiffening.

7. A machine according to claim 1, in which the skirt (12, 13) comprises elements for grasping and/or entraining the fodder.

8. A machine according to claim 6, in which the upper face of the skirt (12, 13) is provided with projections (17).

9. A machine according to claim 8, in which the projections (17) of the upper face of the skirt (12, 13) form part of the latter.

10. A machine according to claim 8, in which the projections (17) of the upper face of the skirt (12, 13) are oriented in the direction opposite to the direction of rotation of the drum (1, 2).

11. A machine according to claim 7, in which the skirt (12, 13) is provided on its external periphery with points (18) of very small dimensions which form part of the said skirt (12, 13).

12. A machine according to claim 7 in which the skirt (12, 13) is provided with indentations (19).

13. A machine according to claim 12, in which the indentations (19) have a rounded form.

14. A machine according to claim 12, in which at least the leading flank (108) of each protuberance (109) situated between the indentations (19) of the outer edge of the skirt (12, 13) of the drum (1, 2) has a substantially straight portion (110) prolonged on each side by a curved portion (111 and 112), of which one portion (111) extends to the apex of the said protuberance (109) and the other portion (112) extends to the bottoms of the indentations (19).

15. A machine according to claim 14, in which the radius (r) of curvature of the curved portion (111) extending to the apex of the protuberance (109) is less than the radius (R) of the curved portion (112) which extends to the bottom of the indentation (19).

16. A machine according to claim 14, in which the curved portion (111) extending to the apex of the protuberance (109) is prolonged to the rear—seen in the direction (X) of rotation of the drum (1, 2)—by a curved portion (113) the radius (R1) of curvature of which is greater than the radius (r) of the said curved portion (111).

17. A machine according to claim 8, in which at least the side (114) oriented forward—seen in the direction (X) of rotation of the drum (1, 2)—of each projection (17) of the upper face of the skirt (12, 13) is inclined upward and rearward.

18. A machine according to claim 17, in which said forwardly oriented side (114) of the projections (17) forms an angle ($\lambda$) between 20° and 70° with the upper face of the skirt (12, 13).

19. A machine according to claim 12, in which projections (17) on the upper face of the skirt (12, 13) are provided which are curved and extend into the apices of the protuberances (109).

20. A machine according to claim 19, in which the forward sides (114) of the projections (17) of the upper face of the skirt (12, 13) are connected to the leading flanks (108) of the protuberances (109).

21. A machine according to claim 8, in which the extremity of each projection (17) which is close to the outer edge of the skirt (12, 13) is cut obliquely.

22. A machine according to claim 8, in which the extremity of each projection (17) which is close to the inner edge of the skirt (12, 13) is cut substantially perpendicularly to the wall of the drum (1, 2).

23. A machine according to claim 6, in which a crown (16) having rigidity greater than that of the skirt (12, 13) is connected to the latter.

24. A machine according to claim 23, in which the internal diameter (D) of the crown (16) is greater than the internal diameter (E) of the skirt (12, 13).

25. A machine according to claim 6, in which the skirt (12, 13) and/or the stiffening elements and/or the elements for grasping and entraining the fodder comprise reinforcements (20) embedded in the said skirt and/or the said elements.

26. A machine according to claim 1, in which the wall of the drum (1, 2) is provided with projections (21).

27. A machine according to claim 1, in which the skirt (12, 13) is fixed to the internal face of the drum (1, 2).

28. A machine according to claim 1, in which the skirt (12, 13) is fixed to the outer face of the drum (1, 2).

29. A machine according to claim 1, in which the skirt (12, 13) is fixed to the bottom of the drum (1, 2).

30. A machine according to claim 1, in which the skirt (12, 13) is fixed on an intermediate element (22) attached to the drum (1, 2).

31. A machine according to claim 1, and means for varying the incidence of the skirt (12, 13) in relation to the ground.

32. A machine according to claim 31, in which the last-named means are constituted by a dish (24) independent of the corresponding drum (1, 2) and having a diameter different from that of the said drum, the position of which dish in relation to the drum can be adjusted by means of a threaded rod (25) so that the edge of the said dish, by bearing upon the skirt (12, 13) determines the incidence of the latter in relation to the ground.

33. A machine according to claim 31, in which the last-named means are constituted by stirrup pieces (28) one of the arms of which is fast with the skirt (12, 13) and the other arm of which is guided on a ramp (30) of a crown (31) the position of which in relation to the drum (1, 2) can be modified by rotation about the rotation axis (9, 10) of the drum (1, 2), by virtue of which the said ramp causes a pivoting of the stirrup pieces (28) which entrain the skirt (12, 13) and determine its incidence in relation to the ground.

34. A machine according to claim 1, and means which control the incidence of the skirt (12, 13) of the drum (1, 2) in relation to the ground, during the rotation of the said drum, in order to keep the said skirt in contact with the ground over at least a large sector of its circumference.

35. A machine according to claim 34, in which the last-named means are constituted by stirrup pieces (35) one of the arms of which is fast with the skirt (12, 13) and the other arm of which is directed upward and comprises a weight (36) which tends to depart from the rotation axis (9, 10) of the drum (1, 2) under the action of the centrifugal force resulting from the rotation of the said drum, the said weight thus causing the stirrup pieces to pivot in such manner that their arms fast with the skirt (12, 13) push the latter downward and keep it in contact with the ground over at least its forwardly direct part—seen in the direction (A) of travel of the machine.

36. A machine according to claim 34, in which the last-named means are constituted by pivots (39) one of the ends of which is fast with the skirt (12, 13) while the other end is guided in a non-rotating cam (37) fixed on the support spindle (7, 8) of the drum (1, 2), the profile of the said cam being arranged in such manner that during the rotation of the drum (1, 2) it causes the pivots (39) to pivot so that their ends fast with the skirt (12, 13) keep the latter in contact with the ground over at least its forwardly directed part—seen in the direction (A) of travel of the machine.

37. A machine according to claim 1, in which the drum (1, 2) has a cylindrical form.

38. A machine according to claim 1, in which the drum (1, 2) has substantially the form of a cone frustum the generatrices of which are rectilinear or curved and the imaginary apex of which is directed toward the ground.

39. A machine according to claim 1, and means (104, 105, 106) for separating foreign bodies from the fodder during working.

40. A machine according to claim 39, in which the skirt (12, 13) of the drum (1, 2) comprises apertures (104) permitting foreign bodies to drop back onto the ground.

41. A machine according to claim 40, in which said aperatures (104) are situated in the vicinity of the wall of the drum (1, 2).

42. A machine according to claim 39, in which the wall of the drum (1, 2) comprises apertures (105) permitting foreign bodies to drop back onto the ground.

43. A machine according to claim 42, in which said apertures (105) are situated at the lower part of the drum (1, 2).

44. A machine according to claim 39, in which the external part of the skirt (12, 13) of the drum (1, 2) is formed by rounded tongues (106) of elongated form.

45. A machine according to claim 44, in which the tongues (106) extend substantially over half of the width of the skirt (12, 13).

46. A machine according to claim 44, in which the tongues (106) are in contact with the ground over only a part of their length.

47. A machine according to claim 44, in which the tongues (106) are oriented in the direction opposite to the direction (X) of rotation of the drum (1, 2).

48. A machine according to claim 1, in which the skirt (12, 13) is formed by a belt (41) guided by at least one drum (1, 2) and comprising at its base a plurality of tongues (42) which overlap and are directed obliquely toward the ground.

49. A machine according to claim 1, comprising several drums (1, 2) each carrying a skirt (12, 13) which are placed side by side and are staggered in relation to one another toward the rear especially for lateral windrowing.

50. A machine according to claim 49, in which the trajectories described by the skirts (12, 13) of the adjacent drums (1, 2) partially overlap.

51. A machine according to claim 50, in which the skirts (12, 13) of the adjacent drums (1, 2) pass partially one over the other.

52. A machine according to claim 49, and means between the adjacent drums (1, 2) to facilitate the passage of the fodder from one drum to the other in the formation of a lateral windrow.

53. A machine according to claim 52, in which the last-named means are constituted by a deflector (46) which extends above the skirts (12, 13) and is connected to a transverse support chassis (3).

54. A machine according to claim 53, in which the deflector (46) is substantially in the form of a (V) the point of which is directed toward the rear of the machine.

55. A machine according to claim 53, in which the deflector (46) is on the one hand substantially tangential to the drum (2) from which it receives the fodder and on the other hand directed substantially radially to the drum (1) to which it transmits the said fodder.

56. A machine according to claim 1, in which laterally of the drum (1) which completes the formation of the windrow in working there are disposed means for clearing fodder from the said drum and from its skirt (12) and for the formation of said windrow.

57. A machine according to claim 56, in which the last-named means are constituted by a deflector (47) substantially tangertial to the drum (1) and extending from the upper face of the skirt (12) of the said drum substantially to the upper level of the drum.

58. A machine according to claim 57, in which the side of the lateral deflector (47) closer to the drum (1)

substantially matches the profile of the latter, the side more remote therefrom being slightly incurved in such manner as to cause a turning of the fodder.

59. A machine according to claim 57, in which the side of the lateral deflector (47) which is more remote from the drum (1) is constituted by flexible rods (48).

60. A machine according to claim 53, in which the deflector (46) situated between two adjacent drums (1, 2) and the lateral deflector (47) comprise, close to their edges turned toward the drums (1 and 2) which transmit the fodder to them, means which facilitate this transmission.

61. A machine according to claim 60, in which the last-named means are constituted by packings (49) of flexible material which are fast with the deflectors (46 and 47) and which sweep the drums (1 and 2) which transmit the fodder to the said deflectors.

62. A machine according to claim 60, in which the last-named means are constituted by lugs (50) situated on the edges of the deflectors (46 and 47) and engaging in grooves (51) extending all around the drums (1 and 2).

63. A machine according to claim 60, in which the last-named means are constituted by freely rotating rollers (52) extending parallel with the drums (1 and 2) and disposed before the deflectors (46 and 47).

64. A machine according to claim 63, in which the rollers (52) at least partially match the form of the skirts (12 and 13) of the drums (1 and 2).

65. A machine according to claim 53, in which the deflector (46 or 47) is arranged so that the angle $\mu$ which it forms with projections (17) on the upper face of the skirt (12, 13) increases progressively as the outer edge of the said skirt (12, 13) is approached.

66. A machine according to claim 65, in which at least the part of the deflector (46, 47) which is disposed above the skirt (12, 13) extends along a curve which departs from the wall of the drum (1, 2) progressively as it is directed toward the rear—seen in the direction (A) of travel of the machine.

67. A machine according to claim 66, in which the curved deflector (46, 47), seen from above, starts substantially at the level of a line (L) perpendicular to the direction (A) of travel of the machine and tangential to the forward face of the wall of the drum (1, 2) and leaves the skirt (12, 13) substantially at the level of a line (M) parallel to a line (L) passing through the rotation axis (9, 10) of the drum (1, 2).

68. A machine according to claim 52, in which said means for facilitating the passage of the fodder from one drum to the other are constituted by a conveyor belt (56) which is driven by one of the drums (1, 2) and is moreover guided by at least one roller (57) substantially parallel with the said drums.

69. A machine according to claim 56, in which said means for favoring at the same time the clearance of the fodder from the drum (1) which completes the formation of the windrow and the formation of the said windrow are constituted by a conveyor belt (56) driven by the said drum and furthermore guided by at least one roller (58) substantially parallel with the drum.

70. A machine according to claim 1, and means to facilitate the passage of the fodder from one drum to the other and to favor at the same time the clearance of the fodder from the drum (1) which completes the formation of the windrow and the formation of the said windrow, constituted by one and the same conveyor belt (56) driven by the said drum (1) and guided by two rollers (57 and 58).

71. A machine according to claim 70, in which the conveyor belt (56) is guided in such manner that its forward run in contact with the fodder passes partially behind the drum (2) from which the said fodder comes and in front of the drum (1) which collects the said fodder and deposits it in the form of a lateral windrow.

72. A machine according to claim 52, in which the last-named means are constituted by an intermediate drum (59) rotating in the same direction as the drums (1 and 2), the base of which intermediate drum at least partially matches the form of the skirts (12 and 13) of the said drums.

73. A machine according to claim 52, in which the last-named means are constituted by a wheel (63) situated substantially between the drums (1 and 2).

74. A machine according to claim 73, in which the wheel (63) is mounted freely in rotation on a downwardly slightly inclined spindle (64) so that it is situated in a forwardly inclined plane.

75. A machine according to claim 73, in which the drums (1 and 2) are of concave form.

76. A machine according to claim 52, in which the last-named means are constituted by flexible rods (65) at least the lower extremities of which are oriented toward the drum (1) which receives the fodder.

77. A machine according to claim 56, in which the last-named means are constituted by flexible rods (67) at least the lower extremities of which are oriented toward the exterior and toward the rear.

78. A machine according to claim 1, in which laterally of the drum (2) closer to the fodder remaining on the ground in a passage with the machine there are disposed means which on the one hand facilitate the separation between the said fodder remaining on the ground and the fodder taken up by the machine, and on the other hand facilitate the entraining of this fodder.

79. A machine according to claim 78, in which the last-named means are constituted by a deflector (68) extending from the upper face of the skirt (13) of the drum (2) substantially to the upper level of the latter.

80. A machine according to claim 79, in which the deflector (68) extends obliquely toward the exterior from the drum (2) with which it is associated.

81. A machine according to claim 79, in which the external extremity of the deflector (68) is rounded.

82. A machine according to claim 78, in which the last-named means are constituted by a conveyor belt (69) driven by the drum (2) closer to the fodder remaining on the ground in a passage with the machine, which belt further passes over a roller (70) substantially parallel with the said drum and disposed laterally thereof.

83. A machine according to claim 68, in which the spaces between the bases of the conveyor belt (56) and the upper faces of the skirts (12 and 13) of the drums (1 and 2) are blocked by deflectors (74, 75 and 76) of a flexible and deformable material.

84. A machine according to claim 78, in which said means for facilitating the separation between the fodder remaining on the ground and the fodder taken up by the machine are constituted by a wheel (71) placed slightly before the foremost drum (2), in a plane transverse to the direction (A) of travel of the machine.

85. A machine according to claim 84, in which the wheel (71) is driven in rotation about a substantially horizontal axis by friction on the ground during working.

86. A machine according to claim 78, in which the last-named means are constituted by flexible rods (72) disposed laterally of the drum (2) closer to the fodder reamining on the ground.

87. A machine according to claim 53, in which at least the side of the deflector (46) which is directed toward the drums (1 and 2) and its base which is close to the skirts (12 and 13) of the said drums are made of a flexible and deformable material.

88. A machine according to claim 1, in which said drums (1 and 2) are driven in rotation from the power take-off of a propelling vehicle.

89. A machine according to claim 88, in which the drums (1 and 2) are driven at different rotation speeds.

90. A machine according to claim 1, in which said drums (1 and 2) are driven in rotation by the ground and for this purpose have a contact zone (P) with the said ground, by virtue of which the displacement of the machine in its travel direction (A) causes the rotation of the said drums about their respective rotation axes (9, 10) which for this purpose are slightly inclined in relation to the vertical toward the side on which the windrow is deposited.

91. A machine according to claim 90, in which the skirts (12 and 13) of the drums (1 and 2) are provided with points (86) of small dimensions to increase ground adhesion.

92. A machine according to claim 90, in which in addition to their zone (P) of contact with the ground, the drums (1 and 2) rest on the ground through a wheel (87) oriented in a plane parallel to the direction (A) of travel of the machine.

93. A machine according to claim 92, in which the wheel (87) is substantially diametrically opposite to the zone (P) of contact of the corresponding drum (1, 2) with the ground and serves to bear upon the bottom portion (84) of the said drum.

94. A machine according to claim 90, in which the drums (1 and 2) are connected to the coupling device (5) by means of elements (91) which permit the said drums to retain their position in relation to the ground during working.

95. A machine according to claim 94, in which said elements (91) constitute a parallelogram.

96. A machine according to claim 90, in which the drums (1 and 2) are interconnected by means of a transmission element in the form of a telescopic shaft (100) comprising Cardan joints (101).

97. A machine according to claim 53, in which the deflector (46) disposed between the two drums (1 and 2) to favor the passage of the fodder from the one to the other is made in two parts (102 and 103).

* * * * *